United States Patent [19]
Reis et al.

[11] Patent Number: 5,973,613
[45] Date of Patent: Oct. 26, 1999

[54] PERSONAL MESSAGING SYSTEM AND METHOD

[75] Inventors: Robert Steven Reis; Vikram Verma, both of Palo Alto, Calif.

[73] Assignee: Raytheon Company, Lexington, Mass.

[21] Appl. No.: 08/971,597

[22] Filed: Nov. 17, 1997

Related U.S. Application Data

[63] Continuation of application No. 08/818,027, Mar. 14, 1997, abandoned, which is a continuation of application No. 08/524,964, Sep. 8, 1995, abandoned, which is a continuation of application No. 08/245,678, May 18, 1994, abandoned, which is a continuation-in-part of application No. 08/145,525, Nov. 4, 1993, abandoned, which is a continuation-in-part of application No. 07/849,878, Mar. 12, 1992, abandoned, which is a continuation-in-part of application No. 07/710,825, Jun. 5, 1991, abandoned, which is a continuation-in-part of application No. 07/538,546, Jun. 15, 1990, abandoned.

[51] Int. Cl.⁶ .................................................. H04Q 1/00
[52] U.S. Cl. ........................... 340/825.44; 340/825.54
[58] Field of Search ........................ 340/825.54, 825.44, 340/825.31, 825.34, 572.1, 573.1, 573.4

[56] References Cited

U.S. PATENT DOCUMENTS

| | | | |
|---|---|---|---|
| 4,471,345 | 9/1984 | Barrett | 340/572 |
| 4,510,495 | 4/1985 | Sigrimis | 340/825.54 |
| 4,636,950 | 1/1987 | Caswell | 340/825.54 |
| 4,644,351 | 2/1987 | Zabarsky | 340/825.44 |
| 4,691,202 | 9/1987 | Denne | 340/825.54 |
| 4,845,491 | 7/1989 | Fascenda | 340/825.44 |
| 4,882,579 | 11/1989 | Siwiak | 340/825.44 |
| 5,005,014 | 4/1991 | Jasinski | 340/825.54 |
| 5,153,582 | 10/1992 | Davis | 340/825.44 |
| 5,194,860 | 3/1993 | Jones | 340/825.54 |
| 5,335,246 | 8/1994 | Yokev | 340/825.54 |
| 5,363,425 | 11/1994 | Mufti | 340/825.54 |

*Primary Examiner*—Brian Zimmerman
*Attorney, Agent, or Firm*—Baker & Botts L.L.P.

[57] ABSTRACT

A pager device received paging messages. The user reads a paging message, selects one of a set of stored, predetermine reply messages, and transmits the selected reply message from the pager. The reply signal is received by one of a set of local cellular receivers, which sends the received signal to a computer for interpretation. The computer initiates an action based on interpretation of the received reply signal. The communication system communicates with large numbers of pagers in a time and energy efficient manner. The pagers are associated with items located in a communication region that is interrogated by an interrogator on a one-to-many basis using broadcast commands, on a one-to-one basis using directed commands or on a combination basis using both methods. Messaging occurs through organized transmission and reception of signals between the pagers and the interrogator. A batch collection protocol uses a combined one-to-many and one-to-one communication system that effectively resolves communication contentions. The batch collection protocol employs a plurality of collection periods which communicate with large or unknown numbers of portable pagers.

21 Claims, 4 Drawing Sheets

PERSONAL MESSAGING SYSTEM AND METHOD

CROSS-REFERENCE TO RELATED APPLICATIONS

This application is a continuation of application Ser. No. 08/818,027, filed Mar. 14, 1997 by Robert S. Reis and Vikram Verma entitled "Personal Messaging System and Method," abandoned pending; which is a continuation of application Ser. No. 08/524,964, filed Sep. 8, 1995, abandoned; which is a continuation of application Ser. No. 08/245,678, filed May 18, 1994, abandoned; which is a continuation-in-part of application Ser. No. 08/145,525, filed Nov. 4, 1993, abandoned; which is a continuation-in-part of application Ser. No. 07/849,878, filed Mar. 12, 1992, abandoned; which is a continuation-in-part of application Ser. No. 07/710,825, filed Jun. 5, 1991, abandoned; which is a continuation-in-part of application Ser. No. 07/538,546, filed Jun. 15, 1990, abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to a system and method of initiating and relaying messages, and more particularly to a two-way paging system using portable pagers (tags) that receive paging signals and initiate or transmit reply messages using a cellular communications network.

The present invention is used in a communication region and particularly for communicating messages in a communication region. The present invention is particularly useful where large numbers of pagers are present in the communication region, where the locations or identities of the pagers in the communication region are not necessarily known, where transport of the pagers to and from the communication region is not necessarily restricted and where contentions among communications to and from pagers need to be resolved in a time and energy efficient manner.

Conventional radio paging systems are limited in that a person having a pager can only receive messages that are sent to the pager. Typically, a person desiring to send a page dials a phone number reserved for the pager. A central paging system answers the call and decodes tones that are subsequently entered by the paging party. Usually, the tones entered by the paging party represent a telephone number the paging party would like one recipient to call. onus, One message received by the portable pager generally calls for some response by the recipient, such as calling the telephone number displayed on the display of the pager. The recipient must normally find some conventional method to contact the party that initiated the page. Typically, the recipient calls the paging party on a telephone to respond.

Conventional paging systems suffer from a number of shortcomings. For instance, there are times when the recipient of a page may not have a telephone available from which to call the paging party. In addition, the paging party typically does not know whether the page was received by the paged party, which is particularly troublesome where the page is urgent. Furthermore, the user of a portable pager may want to initiate transmission of a message regardless of whether a page has been received. Yet another shortcoming is that there is typically no way to track the location of portable pagers with conventional paging systems.

It would be desirable to have a simple method of sending or receiving messages via portable pagers (pagers) independent of a telephone network, as well as determining the location of persons or items associated with those pagers.

The communication region in which the communication occurs may be small or large, cellular or single celled or may have other characteristics. Simple communication procedures may be adequate for small numbers of pagers (pagers), however, for large numbers of pagers, the simple procedures become complex and time consuming. For large numbers, the methods that may work for small numbers are inadequate.

Thus a need exists for an accurate and efficient system that communicates with large numbers of pagers. The system must operate in a time and energy efficient manner.

A number of communication systems exist and these systems are based upon many different technologies. Some of the communications may be in a broadcast mode (one to many) where an interrogator broadcasts to many pagers, others may be in a one-to-one mode where communication is between one interrogator and one pager.

To increase the power of incident radiation and thereby increase the range of a passive reflector system, passive reflector systems have employed focused radiation rather than omni-directional radiation since the incident power of focused radiation tends to be greater than the incident power of omni-directional radiation. Focused radiation, however, is not practical for a location system because it requires prior knowledge of the location and direction of the pager with respect to the transmitting source. Although reflective systems are used as verification or security systems, reflective systems have not proved practical for identification systems for items of unknown location or in an unstructured environment.

Another example is a communication system for interrogating transient pagers brought into the field of an interrogator where the interrogator sends a synchronization signal to responsive pagers and identifies the responding pagers with no acknowledgement to a pager to communicate to the pager that a successful transmission was received by the interrogator. In that system, the interrogator continuously broadcasts interrogation requests and listens for and records, when able, pagers which respond. The collisions which inevitably result from two or more pagers responding simultaneously to the interrogator are attempted to be overcome by having the pagers indefinitely repeat their transmissions at randomly chosen times. Such a system tends to create an unacceptable collision problem in the case of many pagers or stationary pagers and hence is limited to identification of only a few pagers and then only if the few pagers are transient at the interrogator station.

As another example, a communication system uses two frequencies, one for interrogators to send and the other for pagers to respond using various communication sequences. If more than one pager responds, the pager signals collide and the interrogator win detect errors and copy those errors back to the pagers. The pagers transmit again and frequently again collide repeating the error transmissions. The pagers then go silent and respond again after a random time delay. Such a system is deficient in organizing the energy resource. The system is limited to only a few pagers since if expanded to a large number of pagers, the system presents an unacceptable level of energy consumption due to the disorganized method of resolving collisions. The response acknowledge cycle of each single pager, along with the associated time overhead in error determination, requires constant transmission of signals, consuming an excessive amount of power.

Still another communication system employs multiple frequency responses to interrogation where a transmitter transmits messages to a group of pagers. The transmitter transmits pager addresses in a time-multiplexed group on a single frequency to normally sleeping pagers. All pagers wake up and listen to the address to determine if their unique address is contained in the group and if so, at what relative position in the sequence. If a pager determines that its address is not in the group of addresses sent, the pager returns to sleep. If the pager determines that its address is in the group, it remains awake to receive a message sent by the central transmitter. Having received its message, the pager sends back to the central transmitter a response signal on a frequency specified by the relative position of the pager address in the group address transmission. Such a system limits the number of pagers that can respond at any one time to the number of frequencies available for responses. Only a small number of frequencies, perhaps as few as twenty, are practical due to design tradeoffs between the number of frequencies needed and the frequency precision required of the transmitter and receiver design. The antenna design also becomes more expensive and complex due to the wide frequency bandwidth within which such systems must be responsive.

The communication systems described by way of example, and other proposed systems, are unable to satisfy the need to identify one or more of a plurality of pagers within a given area, to resolve collisions in the responses of interrogated pagers and to accomplish these tasks in a time and energy efficient manner for a large number of pagers.

In view of the above background, there is a need for highly efficient communication systems capable of operation in an orderly and time and energy efficient manner with large numbers of pagers to communicate with all pagers.

For an effective communication system for communicating with items in a communication region, many factors must be considered including the following.

The size of the communication region determined in part by the communication range of the signals from interrogator to pagers and from pagers to interrogator.

The rate at which pagers are introduced into and removed from the communication region.

The number of pagers which are within the communication region at any one time where a large number may be hundreds or thousands or more and a small number may be none or a few.

The nature and number of communication channels between the pagers and the interrogators.

The bandwidth of the communication channels between the pagers and the interrogators.

The reliability of the communication channels.

The efficiency of time with which the interrogation process can be completed and the speed of communications.

The type of communication protocol that is employed.

The cost of the system and particularly the cost of each pager.

Power requirements including battery life and size for portable operation.

Additional desirable features of an identification system are the ability to increase the range of the system over a larger communication region by forming adjacent communication cells in a cellular system where each cell includes an interrogator that communicates with pagers over a part of the larger communication region so that a plurality of such interrogators together effectively communicate over the entire communication region. Such a system, having coordinated communications among the cells, defines a wide area system.

In summary, efficient communication systems are needed that communicate with, pagers within a communication region. Since the number of pagers may be hundreds or thousands, the communication protocol is significant and must consider cost, reliability, accuracy, energy efficiency and the other factors identified above. Also, since pagers are transportable when attached to transportable items, the pagers are typically battery operated and hence the need to conserve power in order to extend battery life is of major consideration.

SUMMARY OF THE INVENTION

The present invention incorporates a low-power transmitter capable of sending a user-configurable set of predetermined messages to the paging party or elsewhere using a cellular communications network. Conventional packet communication techniques are used and communications are restricted to short messages (each typically less than 40 characters), thus permitting more portable pagers to operate in the same bandwidth, using less expensive equipment, than if such portable pagers employed a transmitter such as that in a In accordance with the present invention, a two-way pager device provides users with the ability to respond directly to messages like "Please call 325-4555" by selecting one of several pre-configured reply messages such as, "I'll call back in 10 minutes". A user, for instance a user travelling in a vehicle stuck in traffic, can also initiate a message, e.g., "I'll behome20 minutes late", for transmission either to another two-way pager or, via voice synthesis, into a telephone answering machine. In accordance with the present invention, a portable pager finds varied industrial applications other than simple paging. For instance, a pager device is used as an identification pager for personnel within an industrial facility. The pager receives a signal indicative of entry into a restricted zone and automatically transmits an identification response signal. The identification signal triggers a central system to write the event into an access log and unlock access controls such as doors, gates, and the like. Alternatively, the access controls may be unlocked only after a user presses a button on the pager device to initiate a particular reply message. As one exemplary application of such a system, a pager device for security guards allows guards to communicate interactively with one another via pager-initiated messages that trigger a page to a fellow guard. The cellular nature of the paging system allows automatic logging of the guards' rounds throughout a facility, eliminating the requirement for guards to use some manual device to indicate the times at which they reach each checkpoint of their rounds.

The present invention is a communication system that communicates for identifying, locating, tracking or that communicates for other purposes with large numbers of pagers in a time and energy efficient manner. The pagers are located in a communication region that is interrogated by an interrogator on a one-to-many basis using broadcast commands, on a one-to-one basis using directed commands or on a combination basis using both types of commands. Identification occurs through organized transmission and reception of signals between the pagers and the interrogator.

The number or the locations of the pagers (and associated items) within the communication region are not necessarily known to the interrogator.

The present invention employs, in one embodiment, a batch collection protocol that efficiently and effectively resolves communication contentions. The batch collection protocol uses a plurality of organized, time and energy efficient interrogator initiated collection periods which communicate with large numbers or unknown numbers of portable pagers.

In the collection protocol, one-to-many communications occur to direct a plurality of pagers to perform a specific function. An example of a one-to-many communication is an interogator's command that all pagers in the region of the interrogator transmit pager IDs to the interrogator. A one-to-one communication occurs to direct only a specific pager to perform a specific function. An example of a one-to-one communication in the collection protocol is an interrogator command to a specific pager to acknowledge receipt of the pager ID. Other specific functions include, for example, the energizing of a sound device (beeper), the reporting of the results of a data collection, a temperature recording or other transfers of data from interrogator to pager or from pager to interrogator. These communications are performed under the direction of the interrogator or the direction of an external system such as a computer.

To perform inventory functions, the interrogator employs batch collection protocol wherein communication signals are processed during a batch session. The batch session includes a plurality of collection periods, each collection period comprising a listen period and an acknowledge period. In the batch session, the quantity of collection periods and the durations of the listen periods are controlled individually, thus providing a means to identify a large number of pagers in an orderly and time and energy efficient manner and to effectively resolve communication contentions.

During the listen period of each collection period, each of the unidentified pagers is allowed to transmit pager identifying signals to the interrogator only once. During any particular listen period, only a subset of pagers is likely to successfully transmit identifying signals to the interrogator because, for large numbers of pagers, pager communications often collide. To enhance the probability that pagers will successfully communicate, the transmission time for each pager identifying signal is relatively small compared with the full listen period and the times, during the listen period when particular pagers initiate sending their identifying signals, are evenly distributed over the listen period.

During the acknowledge period for each collection period, all pagers identified during the preceding listen period are individually acknowledged in a batch by the interrogator. Each acknowledge signal directs the addressed pager not to respond to subsequent collection periods during the current batch session and instead to enter a low-power state so as to conserve battery power. The acknowledge period is interference free since pagers are permitted to transmit only during the listen period and are required to remain silent during the acknowledge period.

The duration of each succeeding batch collection period is controlled by the interrogator generally to be shorter in time than the previous period by shortening the listen period, taking advantage of the fact that since pagers are collected and acknowledged during previous periods, there remain fewer pagers after each period and therefore there is not the need for long or constant duration collection periods. In this manner, the system features a controlled orderly time efficient collection process.

During the batch session, the communication bandwidth during a particular one of the collection periods is matched with the number of pagers likely to successfully communicate with the interrogator during that particular one of the collection periods so as to tend not to saturate the communication channel during that collection period nor to extend unnecessarily the duration of the collection period thereby conserving battery power. Additionally, during any given collection period, the communications from pagers are distributed over the communication bandwidth available during that collection period so as to tend not to saturate the communication channel during that collection period.

With such distribution of pager communications over different collection periods and the control and distribution of pager communications over the available bandwidth within each collection period, the inventory process is efficiently implemented.

In an embodiment of the present invention where the identification signals and the acknowledge signals share the same common communication channel, the interrogator makes no attempt at transmitting acknowledge signals during the listen period, instead continuing to receive as many identification signals as can be detected during the listen period, storing them for batch processing. The process of storing for batch processing ensures that during the listen period when incoming identification signals are present, no collisions in the communication channel are caused by the interrogator attempting to send acknowledgment signals over the same channel used by the pager identification signals.

The present invention also does not permit repeated transmissions of identification signals from the same pager during the same listen period, but rather forces an unacknowledged pager in one listen period to wait to send until the subsequent listen period thereby further avoiding collisions. Since the transmission time of the pager identification signal is small relative to the listen period, the probability of pager responses colliding with one another is small and gets even less probable as the collection process continues. The probability of collision in each period is determined by the duration of the listen period, the number of pagers unacknowledged and the degree of randomness of the transmit delay for each transmission. Accordingly, the present invention is effective in avoiding saturation and resolving contention.

The batch collection protocol thus operates with a sequence of collection periods where some of the pagers are identified in different ones of the collection periods, the duration of succeeding periods being progressively shorter, until all pagers within the region are identified.

The present invention also incorporates one-to-one communication wherein the interrogator may direct an individual pager to execute a function such as turning on a beeper for a period of time or to prepare a list of data bytes and transmit the data back to the interrogator. This one-to-one communication does not use the batch collection protocol but instead employs an energy efficient protocol to locate and identify and communicate to one or a subset of the plurality of the pagers in the region of the interrogator.

The present invention conveniently employs pager apparatus which incorporates omni-directional antennas described in the U.S. patent application Ser. No. 08/068,682, entitled AN EFFICIENT ELECTRICALLY SMALL LOOP ANTENNA WITH A PLANAR BASE ELEMENT. The present invention also employs interrogators having a plurality of antennae thus providing spatial and polarization diversity. These antenna may each be separately engaged for transmission and reception, and in addition, the pager signal strength as received by each antenna separately is monitored and recorded, thus providing an indication of the optimum antenna orientation for communication. This combination of omni-directional pager antennas and interrogator antenna diversity ensures efficient, effective communications. In the preferred embodiment a typical useable range extends beyond one hundred meters.

The foregoing and other objects, features and advantages of the invention will be apparent from the following detailed description in conjunction with the drawings.

DESCRIPTION OF THE PREFERRED EMBODIMENTS

Figure 1:
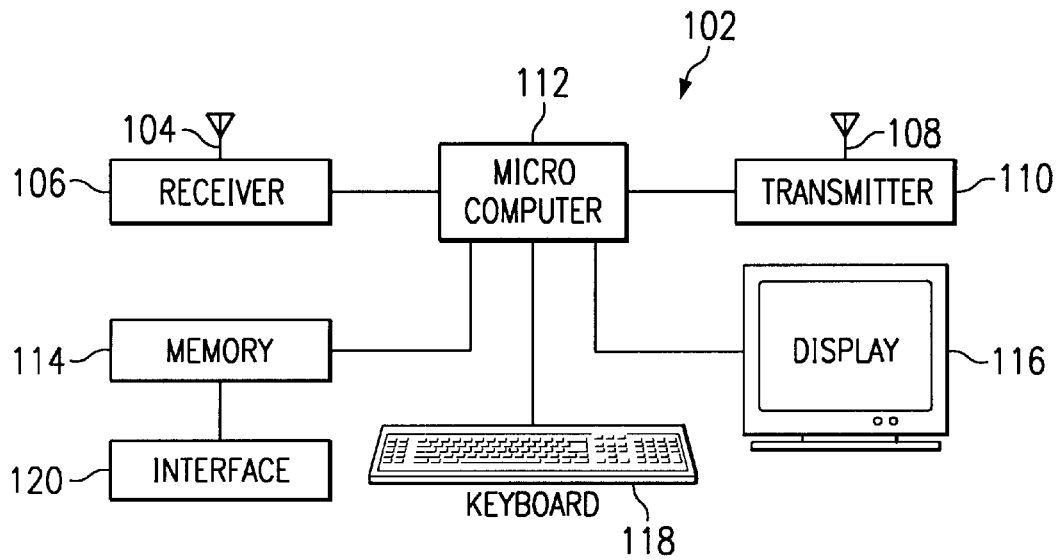
FIG. 1 is a block diagram of a two-way pager device in accordance with the present invention.

Portable Pager—FIG. 1

Referring now to FIG. 1, there is shown a portable pager 102 in accordance with the present invention. Conventional pager receiving subsystem 106 receives paging signals via receiver antenna 104. In the preferred embodiment, receiver 106 is an FM superheterodyne receiver. Receiver 106 is conventionally coupled to microcomputer 112, which interprets the signal received by receiver 106 and produces the corresponding paging messages on display 116.

In accordance with the present invention, pager 102 also includes memory 114 that stores a number of predefined messages that the recipient of the paging signals can use to respond to a page. For instance, data corresponding to predetermined messages such as "Will return the call within the hour"; "Cannot return the call at this time"; "Message acknowledged"; "Message received—proceed"; "Message received—do not proceed"; and "Refer this message to Dr. Jones" can be stored in memory 114. In order to conserve space in memory 114, a conventional encoding scheme may be used so that common messages are stored and transmitted using relatively short codes, while unique or uncommon messages may require longer codes. In the preferred embodiment of the invention, memory 114 is capable of storing between 50 and 100 standard messages. Microcomputer 112 is programmed in a conventional manner to show the user the available message choices on display 116. Interface module 120 connects to a conventional computer system (not shown), such as an ordinary personal computer or electronic personal organizer, to permit a user to preprogram messages into memory 114 as required for the user's particular needs. While the functional block diagram of FIG. 1 shows a direct connection between interface 120 and memory 114, other possible implementations will be readily apparent to those skilled in the art.

In accordance with the present invention, interface 120 may be omitted entirely, and messages may be programmed into memory 114 through receiver 106. Specifically, a user may telephone a system operator and request the addition of a particular message to memory 114. The operator causes a special paging message to be sent which, when received by receiver 106 and processed by microcomputer 112, loads the new message into memory 114.

Display 116 may be small enough that only one reply message, or part of a message, is displayable at one time. Using keyboard 118, the user can scroll through the available messages and select one that the user desires to transmit as a response. Keyboard 118 can include two pushbuttons, one for scrolling through the choices and the other for making a selection. Alternatively, keyboard 118 can be as simple as a single pushbutton, with the user pressing the button once to scroll to the next available message and twice in rapid succession to select the currently displayed message. As yet another alternative, the user could push and quickly release a single pushbutton to scroll through selections, and push and hold the pushbutton for some longer predetermined period to select the displayed message. Other possibilities will be apparent to those skilled in the art.

After the user has selected a message, microcomputer 112 directs transmitter 110 to transmit data corresponding to that message via transmitter antenna 108, using conventional packet communications techniques. While separate antennas 104, 108 are shown in FIG. 1, a single antenna may also be used for both transmitting and receiving.

Transmitter 110 is a conventional transmitter operating at any convenient frequency. Those skilled in the art will recognize that a frequency somewhat close to that of receiver 106 allows sharing of antennas and other components between receiver 106 and transmitter 110, but any available frequency can be used for receiver 106 and transmitter 110 in accordance with the present invention.

Also in accordance with the present invention, receiver 106 and antenna 104 may be omitted entirely to provide a oneway messaging device. Such a device may be beneficial in a number of applications, such as electronic lock systems and remote-controlled sports scoreboards. The display 116 may also be omitted so that the pager 102 becomes a beacon-type device usable for tracking the location of items or people. Examples of such use may be in the tracking of assets, working-process, or children.

One example of an asset-tracking application is inventory control of expensive equipment, such as portable hospital diagnostic equipment. A pager 102 attached to such equipment can be configured to respond to a received interrogation signal and to initiate its own transmission upon occurrence of a predefined event, such as a six-week time period elapsing since the last calibration of the associated diagnostic equipment.

A work-in-process application involves attaching pager 102 to equipment being manufactured so that the movement of the equipment through an assembly facility may be tracked. Assembly workers may select and transmit preset messages from pager 102 to a central assembly control system so that the state of completion and the location of every unit of working-process may easily be monitored.

A child tracking application involves children each wearing a pager, e.g., 102 so that their whereabouts within a facility (such as a large amusement park) may be monitored. In addition to helping parents locate lost children, such pagers 102 allow park operators to study usage patterns throughout the park.

Figure 2:
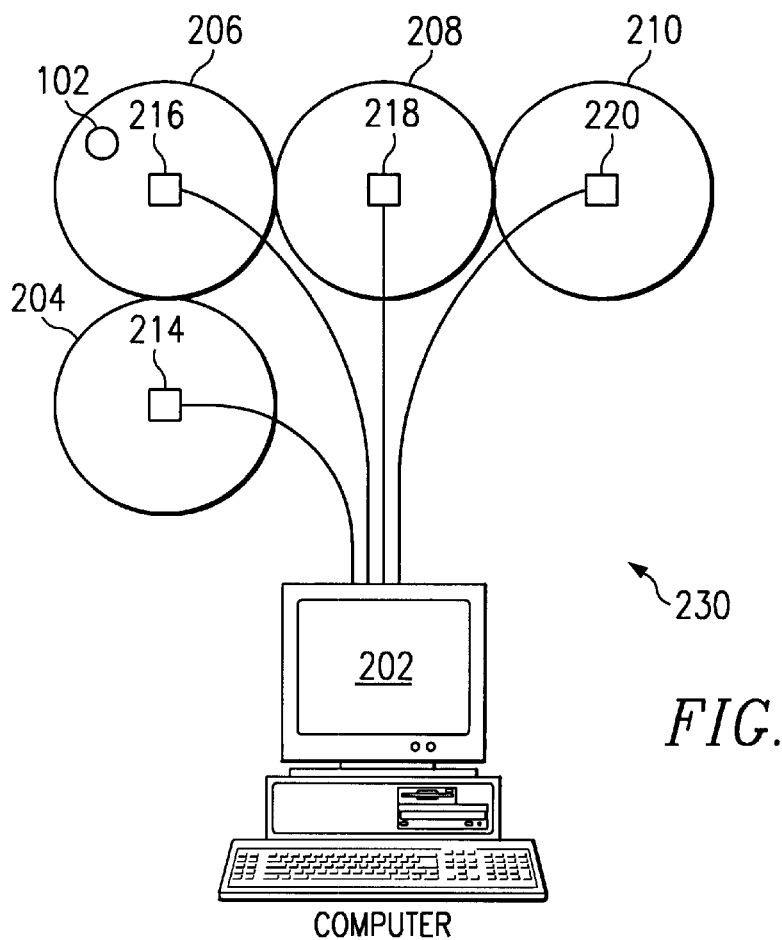
FIG. 2 shows the use of a two-way pager device in a communications system in accordance with the present invention.

Pager Operation—FIG. 2

Referring now to FIG. 2, there is shown operation of pager device 102 in a cellular communications environment 230. Pager device 102 receives paging signals from, and sends response signals to, the nearest local cellular transceiver 216. Local cellular transceivers 214, 216, 218, and 220 are positioned to define communication cells 204, 206, 208, and 210, respectively, in the conventional manner. Local cellular transceivers, e.g., 216, are conventional in design and may be part of a standard cellular telephone network, for instance with the paging signals being transmitted as a subcarrier on standard cellular telephone frequencies, or between standard cellular telephone channels as described in above-referenced U.S. Pat. No. 4,914,651. Alternatively, local cellular transceivers, e.g., 216, may form a dedicated paging or messaging network.

In accordance with the present invention, local cellular transceivers, e.g., 216, need not be integrated transceivers but can be completely separate receivers and transmitters. As one possible alternative, paging messages could be transmitted from a single central transmitter, such as from a tall transmission tower or satellite, and the local transceivers, e.g., 216, can serve only to receive and perhaps acknowledge reply signals from pager device 102. Depending on the particular application, pager devices, e.g., 102 and cellular transceivers, e.g., 216 can be configured to operate in half-duplex or full-duplex modes, allowing realtime bidirectional communication.

In accordance with the present invention, pager device 102 employs techniques for "handshaking" and collision avoidance so that a large number of pager devices can operate simultaneously within the same communications cell, e.g., 206. Techniques as described in the referenced co-pending U.S. patent applications, Ser. Nos. 07/710,825 and 07/538,546, are used for this purpose. For instance, the transceiver, e.g., 216 transmitting the paging signals also periodically transmits a timing mark. Pager device 102 delays transmission of a reply signal a random time period after receipt of such timing mark. Thus, local transceivers, e.g., 216, need only listen for reply signals during a brief period following each timing mark. Since transmission of each reply signal is delayed a random amount of time, a relatively small reply time window is used to collect replies from a number of pager devices. Furthermore, this system permits time-multiplexing, in which the frequency used for the reply signals can be put to other uses outside of the reply time window.

To further increase the robustness of communications, a local cellular transceiver, e.g., 216, sends an acknowledgement signal back to pager device 102 indicating receipt of the reply message. If pager device 102 does not receive acknowledgement of its reply message (e.g., due to interfering signals from other pager devices), it automatically resends its reply signal until it is acknowledged, using the techniques set forth in the referenced co-pending applications.

Each local cellular transceiver, e.g., 216, is connected to computer 202 of conventional design. Computer 202 interprets the reply signal received by cellular transceiver 216 from pager device 102 and takes an appropriate action. For instance, if the reply signal represents a reply message, "Will return the call within the hour", computer 202 institutes a telephone call to a predetermined number (e.g., to the paged person's secretary) and delivers a synthesized voice message (e.g., "Dr. Smith has received your page and will call the number transmitted in the page within the hour"). In this case, the secretary could then relay this message, if required, to the person who originally requested the page. Alternatively, computer 202 could send a fax transmission or electronic mail message rather than a synthesized voice message, or could even initiate the transmission of a signal to another pager. Referring now to FIGS. 1 and 2, pager 102 and computer 202 may be programmed to send particular reply messages directly to clients, patients, or customers, as appropriate, rather than sending every message to the paged party's secretary for further relay. The number of available reply messages is limited only by the size of the memory 114 and the bandwidth available for the message signals. Conventional encoding schemes can be employed to reduce the bandwidth required for transmitting reply signals.

Because the reply signal of the pager device 102 is received by a local cellular transceiver 216, computer 202 can determine that pager 102 is located within cell 206. This location information can be used in a variety of ways. For instance, access to secure facilities can be allowed or inhibited, or an alarm may sound if the pager does not correspond to one worn by personnel who are authorized to be in that area.

More specifically, personnel within an industrial facility can wear pager 102 instead of a conventional identification pager. If a person wearing pager 102 enters a restricted zone, computer 202 determines whether the person has authorition to be in that zone and either unlocks access controls such as doors and gates, or locks such access controls and sounds an alarm. Computer 202 automatically monitors and logs all entries and exits as required for facility security needs.

In a related application of the invention, security guards each wear a pager 102 as they make their rounds through a facility. Computer 202 logs their movements. A guard needing to communicate with other guards or with a central office uses pager 102 to send and receive messages. Computer 102 automatically appends to the message transmitted by the guard information about the guard's location, so a message such as "prowler spotted" can be received by a central station or other guards as "prowler spotted on fifteenth floor".

Thus, a cellular paging system communicates one of a set of predetermined reply messages, selected by the user, responsive to receipt of a paging signal.

Figure 3:
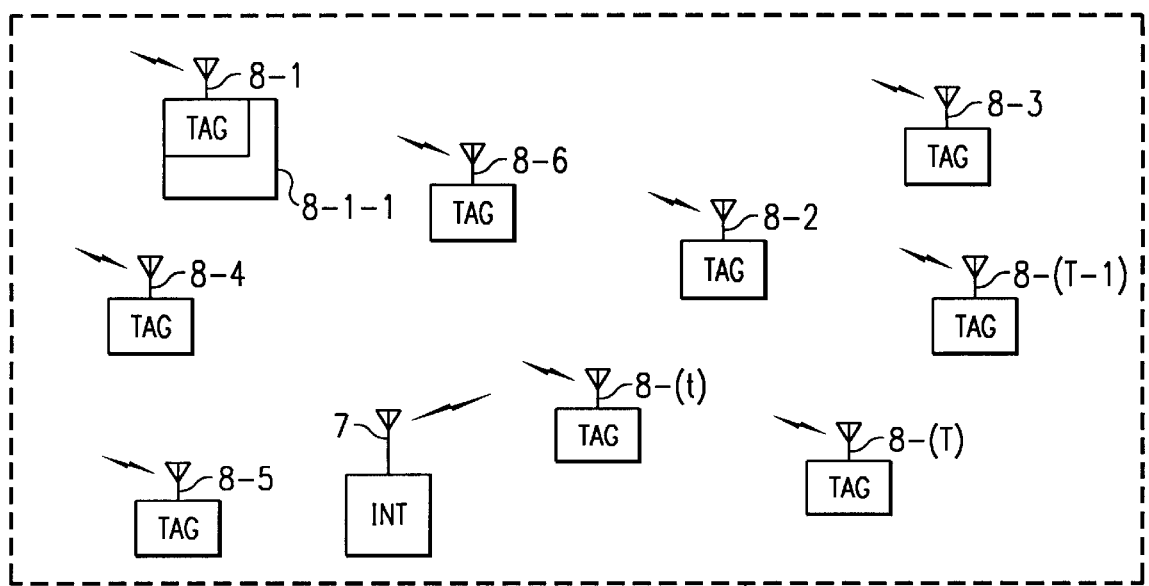
FIG. 3 depicts a communication region formed of one cell in which an interrogator communicates with a plurality of pagers.

FIG. 3—Communication System

In FIG. 3, a communication region is shown as a single cell 9 that includes a plurality T of pagers 8-1, 8-2, . . . , 8-(t), . . . , 8-(T-1), 8-(T) that communicate with the interrogator 7. The interrogator 7 and the pagers 8 form a communication system that operates in the communication region of cell 9. The communication region in typical embodiments is enclosed within a radius of less than one mile from the interrogator 7 and typically contains 50 to 1000 of the pagers 8. Each of the pagers 8 transmits and receives communications to and from the interrogator 7 and interrogator 7 also transmits and receives communications to and from the pagers 8. The cell 9 contains items and each item typically has a pager 8 attached by adhesive, clip or other convenient binder so that locating, tracking, identifying or communicating with a pager is the same as locating, tracking, identifying or communicating with the attached item. For purposes of illustration, the pager 8-1 of FIG. 3 is associated with the item 8-1-1 of FIG. 3. Each of the other pagers 8 is similarly associated with items which for clarity are not shown.

Many types of transmitters and receivers (sometimes called "transmitters/receivers" or "transceivers") can be used for the pagers 8 and the interrogator 7. Such devices can employ infrared, acoustic, radio frequency, optical or magnetic means and the communication medium may be wire, optical fiber or air. In preferred embodiments, very high frequency (VHF) radio frequency is used in an air communication medium so that the transmitter power, antenna size requirements and device range capability are satisfactory for local communication ranges suitable for warehouses, buildings, vehicles and other similar local regions.

Figure 4:
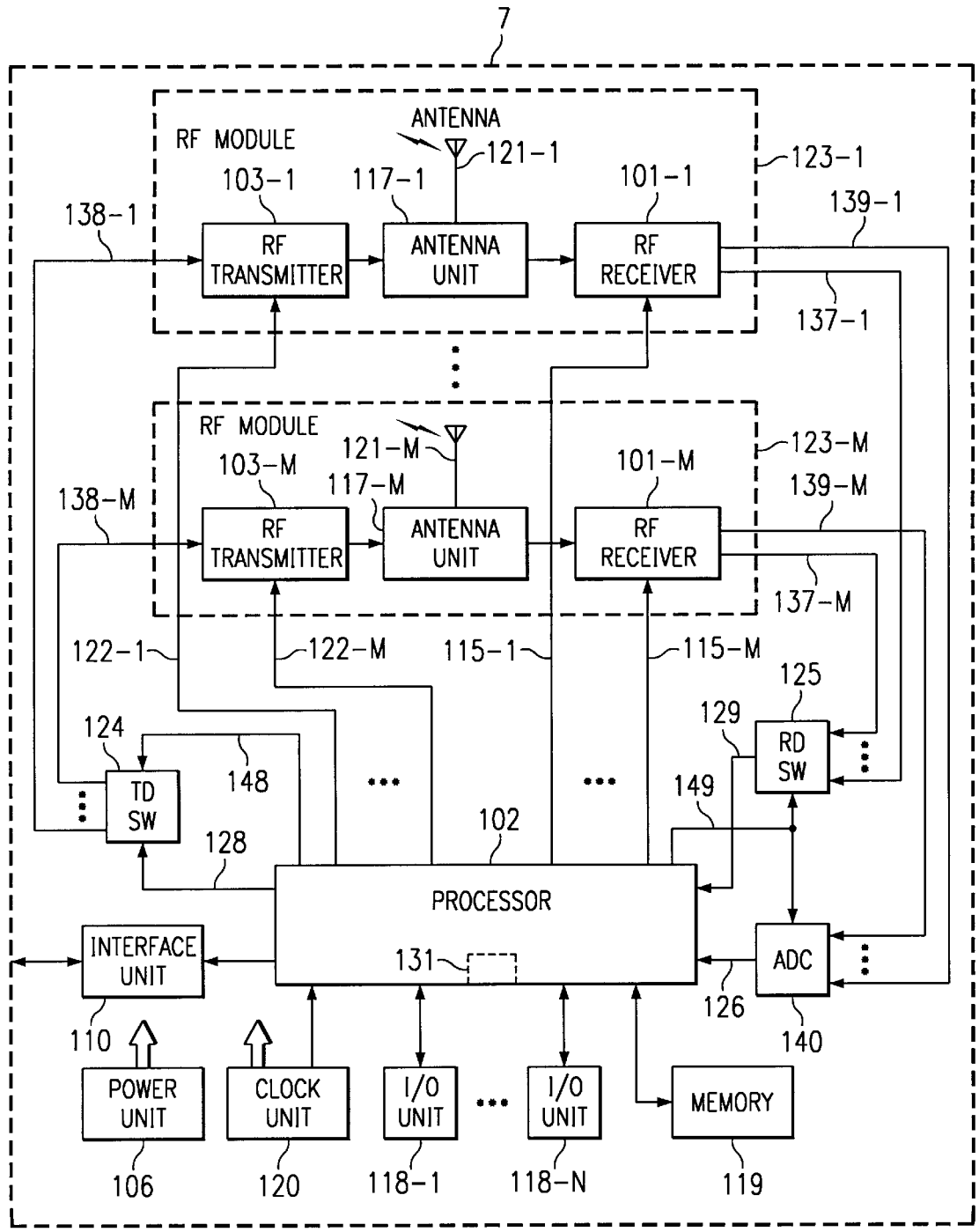
FIG. 4 depicts a block diagram of a typical interrogator.

FIG. 4—Interrogator

In FIG. 4, further details of the interrogator 7 of FIG. 3 are shown. The interrogator 7 includes one or more radio frequency (RF) transmitter/receiver (transceiver) modules 123, particularly, the RF modules 123-1, . . . , 123-M. Typically, the value of M is 2 or 3 so that interrogator 7 typically includes 2 or 3 RF modules 123. The interrogator 7 includes an interrogator processor 102 for processing commands from an interrogator command set. The interrogator RF modules 123 connect to interrogator processor 102 for sending and receiving communications to and from pagers 8 of FIG. 3 including pager commands, synchronizing signals and acknowledge signals. The processor 102 together with the synchronizing code stored in memory 131 is a synchronizing means for communications with pagers 8. RF module 123 contains RF transmitter 103, which is a respective one of frequency modulating RF transmitters 103-1, . . . , 103-M, and contains RF receiver 101, which is a respective one of RF receivers 101-1, . . . , 101-M. RF receiver 101 is typically a conventional superheterodyne receiver or other similar receiver.

The power to the RF modules 123-1, . . . , 123-M and other components of the interrogator of FIG. 4 is from the power unit 106. The power states of the RF transmitters 103-1, . . . , 103-M are controlled by control lines 122-1, . . . , 122-M, respectively. The power states of RF receivers 101-1, . . . , 101-M are controlled by control lines 115-1, . . . , 115-M, respectively. The control lines 122-1, . . . , 122-M and 115-1, . . ., 115-M are controlled by processor 102 by means of which the processor 102 has control over the receive and transmit functions of RF modules 123-1, . . . , 123-M, respectively.

RF module 123 contains an antenna unit 117 which is a respective one of the antenna units 117-1, . . . , 117-M. Antenna unit 117 is typically a diode network that is responsive to the power states of RF transmitter 103 and RF receiver 101 and functions automatically to connect RF transmitter 103 to antenna 121 which is a respective one of the antennas 121-1, . . . 121-M for transmission of RF signals to the pagers 8 of FIG. 3 or to connect antenna 121 to RF receiver 101 for reception of RF signals from the pagers 8.

The RF modules 123-1, . . . , 123-M receive the processor output signals, to be transmitted, on the respective data signal lines 138-1, . . . , 138-M, respectively, from the transmit data switch 124 and provide processor input signals, received from pagers 8, to lines 137-1, . . . , 137-M, respectively, which connect as inputs to the receive data switch 125. The RF modules 123-1, . . . , 123-M also provide receive signal strength indications to signal strength indication lines 139-1, . . . , 139-M which connect as inputs to analog-to-digital converter (ADC) 140. The analog-to-digital converter 140, under control of control lines 149 from processor 102, provides a digital representation via input line 129 of the signal strength indications on lines 139-1, . . . , 139-M to processor 102.

The receivers 101, lines 139 and converter 140 are signal strength detector means for detecting the signal strength of the received signals from the pagers 8 and providing a signal strength indication to interrogator processor 102.

The transmit data switch 124, under control of processor 102 by control lines 148, switches the data signal 128 from processor 102 to one of data signal lines 138-1, . . . , 138-M. The receive data switch 125, under control of processor 102 by means of control signals on lines 149, switches the data signal lines 137-1, . . . , 137-M from RF receivers 101-1, . . . , 101-M to the data signal line 129 which is input to processor 102.

In the arrangement described, the interrogator processor 102 has independent control of which of the RF modules 123 are to receive power, which of the transmitters 103 in RF modules 123 are to function as transmitters as controlled by lines 122-1, . . . , 122-M and which of the receivers 101 in RF modules 123 are to function as receivers as controlled by lines 115-1, . . . , 115-M.

For example, processor 102 may select RF module 123-1 for the transmission function, in which event, control signals on line 148 from processor 102 configure the transmit data switch 124 to connect the processor data signal line 128 to the data signal line 138-1 for input to RF module 123-1 and control line 122-1 from processor 102 enables RF transmitter 103-1. Similarly, processor 102 may select RF module 123-M for a reception function, in which event control signals on line 149 from processor 102 configure the receive data switch 125 to connect the receiver 101-M data signal line 137-M to the receive data processor input signal line 129 for input to the processor 102 and control line 115-M from processor 102 enables RF receiver 101-M.

In the preferred embodiment, the use of two or more RF modules 123 and associated antennas 121 provides diversity in the transmissions to and from the pagers in the FIG. 3 system so as to incree the reliability and robustness of the communication. Although many different types of diversity are possible, the preferred embodiment uses both spatial and polarization diversity.

Each of antennas 121-1, . . . , 121-M is spatially offset from the others and is relatively oriented in a different direction from the others, thus providing both spatial and polarization diversity, respectively. Any one of the pagers 8 of FIG. 3 which may have poor reception from one of the antennas 121 of interrogator 7 is apt, because of the spatial and polarization diversity, to have better reception from another one of the antennas 121. Similarly, any one of the antennas 121 of the interrogator 7 having weak reception from one of the pagers 8 of FIG. 3 is apt to have stronger reception from other ones of the antennas 121.

The communication protocol may select the optimum one of the RF modules 123 in the interrogator 7 for communication with any particular one of the pagers 8. The optimum one is determined by the signal strength through ADC 140 and operation of processor 102. Generally, the optimum RF module for a particular one of pagers 8 is the one reporting the highest signal strength.

The processor 102 is any conventional microprocessor having a speed sufficient to process the data and control the functions of interrogator 7. In a preferred embodiment, processor 102 is a Motorola MC68HC05C9, an eight-bit microcontroller having an internal instruction code memory 131. The processor 102 executes interrogator sequencing code stored in the interrogator memory 131 which controls the collection protocol and controls the transmission and reception of information between the interrogator 7 and pagers 8 of the system of FIG. 3. The memory 131 also stores pager commands that are to be transmitted to the pagers for controlling the operation of the pagers.

The interrogator 7 also includes an interface unit 110 connected in a conventional manner to processor 102 functioning to process data communication between processor 102 and computer data processing devices (not shown in FIG. 4) external to interrogator 7. The external devices can be computers directly connected or connected over a network to interface unit 110.

The interrogator 7 also may include I/O units 118-1, ..., 118-N that connect in a conventional manner to the processor 102. The I/O units 118 are optional and can include display units, keyboards or other conventional I/O devices.

Processor 102 is also connected to memory 119. Memory 119 typically stores configuration and other data associated with I/O units 118, associated with other external devices or associated with interface unit 110 connecting to a computer (not show in FIG. 4). Memory 119 is typically an EEPROM memory. The processor 102 in one embodiment includes both internal memory 131 and external memory 119 that together constitute the interrogator memory. However, the interrogator memory can be either internal or external or can be both as shown.

The interrogator 7 includes a clock unit 120 which provides the timing signals to the processor 102 and other components of the interrogator 7 and may include a time-of-day clock.

FIG. 5—Pager

Figure 5:
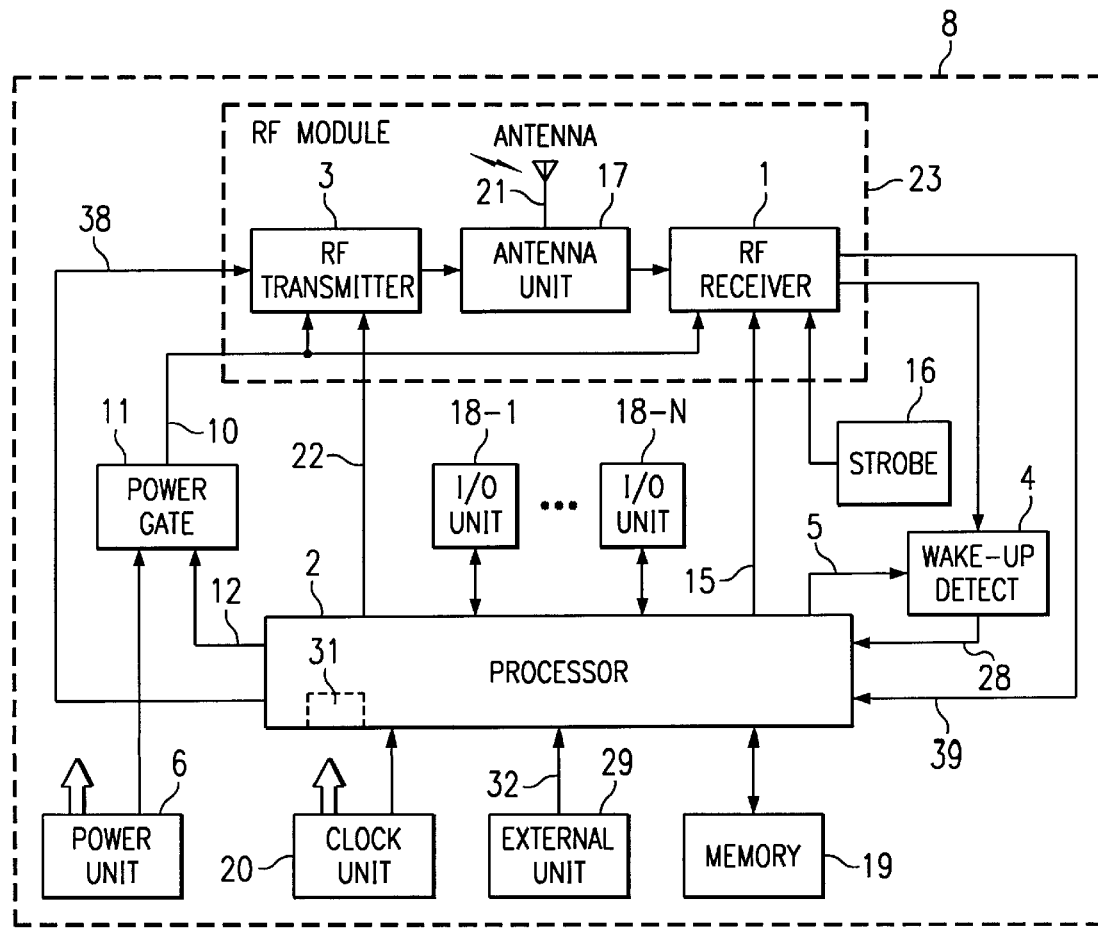
FIG. 5 depicts a block diagram of a typical pager.

In FIG. 5, further details of a typical one of the pagers 8 of FIG. 3 are shown. The pager 8 includes a radio frequency (RF) transceiver module 23. RF module 23 contains RF transmitter 3 and RF receiver 1. RF receiver 1 is typically a conventional superheterodyne receiver or other similar receiver.

The RF module 23 receives power lines 10 from the RF controllable power-gate module 11 which is controlled by RF power-gate module control line 12 from processor 2. The power state of the RF transmitter 3 is controlled by control lines 22. The power state of RF receiver 1 is controlled by control lines 15. The control lines 22 and 15 are controlled by processor 2 by means of which the processor 2 has control over the receive and transmit functions of RF module 23. The power unit 6 provides power to the pager transceiver 23 in either the low-power state or the normal-power state as selected by power gate 11.

RF module 23 contains an antenna unit 17 which is a diode network or other circuit responsive to the power states of RF transmitter 3 and RF receiver 1 and functions automatically either to connect RF transmitter 3 to antenna 21 for transmission of RF signals to the interrogator 7 FIG. 3 or to connect antenna 21 to RF receiver 1 for reception of RF signals from the interrogator 7.

The RF module 23 receives the processor output signals to be transmitted on the data signal lines 38 from processor 2 and provides signals received from interrogator 7 to line 37 which connects as a processor input to the processor 2. The RF module 23 also provides received signals on line 39 to a wake-up detector 4. The detector 4 operates to sense the presence of wake-up signals on line 39 that indicate that a communication has been received from the interrogator 7 of FIG. 3.

Antenna 21 is typically an omni-directional antenna for RF communication that provides good sensitivity at multiple signal polarizations. One example of such an antenna that provides excellent sensitivity is disclosed in U.S. patent application Ser. No. 08/068,682, entitled AN EFFICIENT ELECTRICALLY SMALL LOOP ANTENNA WITH A PLANAR BASE ELEMENT.

The preferred operation of the pager 8 is to switch to a low-power mode (sleep mode), through operation of the power gate 11, whenever possible so as to conserve the energy of power unit 6. In the preferred embodiment, power unit 6 is a small battery and hence power conservation is important. Prior to entering the sleep state, processor 2 enables the wake-up detector 4 by means of control line 5, to detect any wake-up signal that arrives from the interrogator 7.

The pager 8 includes strobe 16, a conventional pulse generator providing a power strobe signal which is active for a short period (approximately three milliseconds in one preferred embodiment) and inactive for a long period (approximately three seconds in one preferred embodiment). During the sleep state, strobe 16 periodically powers RF receiver 1 to receive any wake-up signals that may be transmitted from the interrogator 7 of FIG. 3. If a wake-up signal is detected, the pager 8 changes to the normal-power mode and prepares for communication with the interrogator 7. If no wake-up signal is detected, the pager 8 remains in the sleep state.

The processor 2 is any conventional microprocessor having a speed sufficient to process the data and control the functions of pager 8. In a preferred embodiment, processor 2 is a Motorola MC68HC05P1 eight-bit microcontroller having an internal instruction code memory 31. The processor 2 executes pager sequencing code stored in the pager memory 31 which controls the transmission and reception of information from the interrogator 7 and participates in the pager collection and other protocols for the system of FIG. 3. The pager processor 2 is connected to the pager transceiver module 23 for processing the pager sequencing code in response to pager commands received by the pager transceiver to send a pager ID to the interrogator transceiver in response to one of the synchronizing signals and responsively to receive one of the acknowledge signals from the interrogator.

Processor 2 includes a reset input 28 connected from wake-up detector 4 to reset the processor 2, causing processor 2 to leave the low-power mode and enter the normal-power mode. Processor 2 also includes an interrupt input 32 connected from external unit 29 to the processor that causes processor 2, in response to an interrupt signal on interrupt input 32, to exit the low-power mode and enter the normal-power mode.

Processor 2 is connected to memory 19. Memory 19 is typically an EEPROM memory, although other memory devices, preferably forms of non-volatile memory (NOVRAW so as to conserve energy, may be used.

The processor 2 in one embodiment includes both internal memory 31 and external memory 19 that together constitute the pager memory. However, the pager memory can be either internal or external or can be both as shown. The pager memory stores information that may have been received from interrogator 7 of FIG. 1, from external sources by means of the I/O units 18 or from other units. On command from the interrogator 7, the pager may be caused to transmit data from the pager memory to the interrogator 7.

The pager 8 also may include I/O units 18-1, ..., 18-N that connect in a conventional manner to the processor 2. The I/O units 18 are optional and can include such things as sound devices (beepers), display units, keyboards, temperature sensors, RS232 devices or other conventional and non-conventional I/O devices. In one embodiment, a beeper is included as an I/O device.

Each pager in the system typically has a unique pager ID that distinguishes all pagers from each other. The pager ID is typically stored in the pager memory although it may be specified by or included as one of I/O units 18.

The pager 8 includes a clock unit 20 which provides the timing signals to the processor 2 and other components of the pager 8 and may include a time-of-day clock.

The power unit 6 provides the power to all of the components of the pager 8. Typically, the power unit 6 is a battery so that the pager 8 is transportable without the necessity of connection to an external power source although, in some embodiments, other sources of power may be employed.

Figure 6:
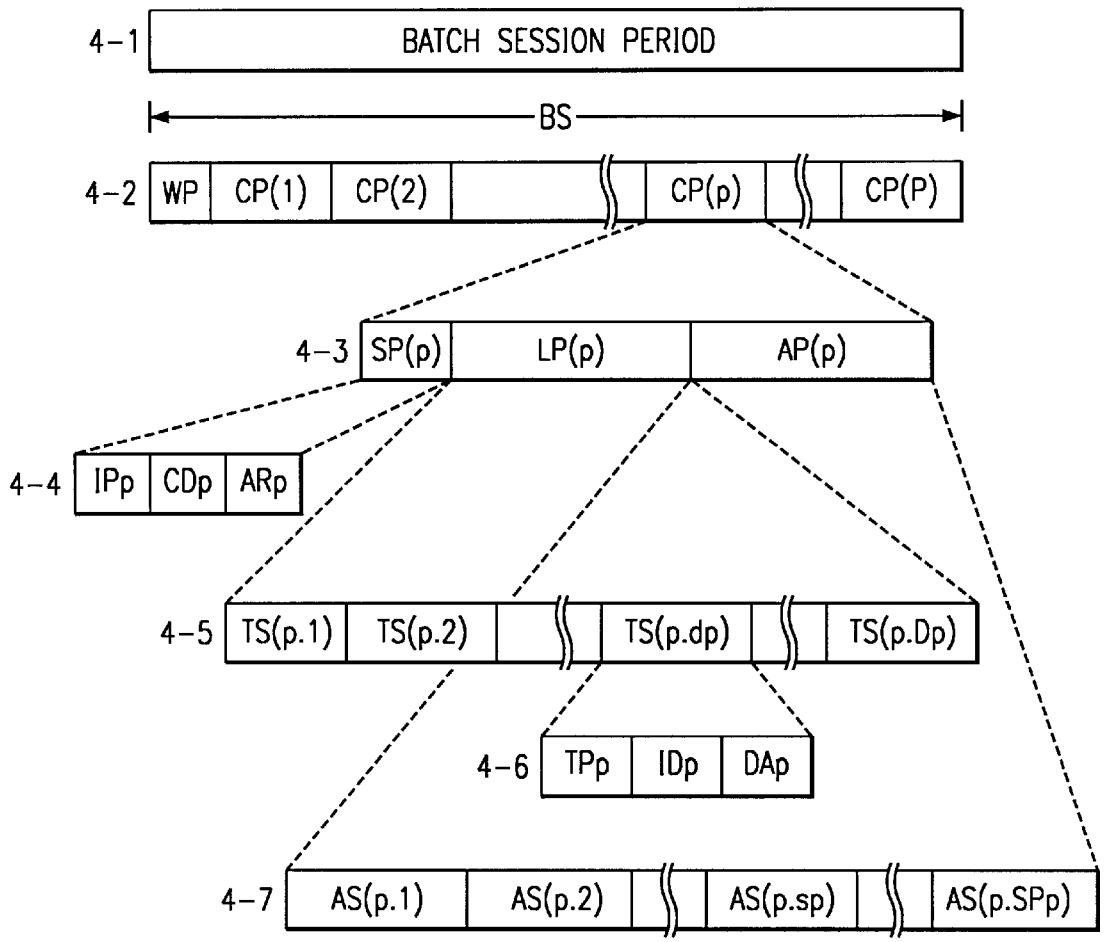
FIG. 6 is a schematic timing diagram of the batch session period for executing the batch collection protocol in the FIG. 3 system.

FIG. 6—Batch Collection Protocol

In FIG. 6, the batch collection protocol is represented. The batch collection protocol is useful, for example, for takdng inventory of all pagers 8 in the communication region 9 of FIG. 3. The inventory process occurs over a batch session (BS) period 4-1 that includes two way communication between the interrogator 7 and the pagers 8.

The batch session BS as indicated in 4-2 of FIG. 6 includes an initial wake-up control period, WP, for waking up the pagers and a plurality P of batch collection periods, CP(1), CP(2), . . . , CP(p), . . . , CP(P). In one particular embodiment, the wake-up signal sent by interrogator 7 during the WP period is a 30.5 Khz square wave modulation of the RF carrier sent for a period of 3.492 seconds, this period being longer than the 3 second period of the wake-up signal detect strobe during which the receiver 1 of each of pagers 8 is enabled for 3 milliseconds to receive the wake-up signal.

During each batch collection period, a batch of pagers that constitute a subset SS of the total set T of pagers 8 in the communication region 9 of FIG. 3 successfully communicate with the interrogator 7. Specifically, a first subset of the pagers 8 that successfully communicate during collection period CP(1) is designated SS(1). For example, subset SS(1) might include pagers 8-4, 8-2, 8-(t) and others of FIG. 3. Some of the pagers of FIG. 3 that do not successfully communicate during collection period CP(1), may successfully communicate as one of a second subset SS(2), during collection period CP(2), or may thereafter communicate, as one of a subsequent subset SS(p), that successfully communicates during a subsequent collection period CP(p). The batch collection period CP(P) is the final opportunity for the pagers 8 to communicate during a batch session as part of the final subset SS(P). The value of P is selected large enough to ensure that all pagers that can communicate will have successfully communicated by the CP(P) collection period. In one embodiment, P has the value of 20. In typical operation, all pagers are collected in 5 or less collection periods so that 20 collection periods provides a large safety margin.

In summary, the subsets SS of pagers that successfully communicate during collection periods CP are designated SS(1), SS(2), . . . , SS(p), . . . , SS(P) and correspond respectively to collection periods CP(1), CP(2), . . . , CP(p), . . . , CP(P). In a communication system where all pagers 8 successfully communicate, the sum of the number of pagers in each of the subsets SS(1), SS(2), . . . , SS(p), . . . , SS(P) is equal to the total number T of pagers in the communication region.

For the subsets of pagers SS(1), SS(2), . . . , SS(p), . . . , SS(P), the corresponding pagers that are in the subsets are identified as follows. Subset SS(1) comprises SS1 pagers, including pagers T(1,1), T(1,2), . . . , T(1,ss1), . . . , T(1,SS1). Subset SS(2) comprises SS2 pagers, including pagers T(2, 1), T(2,2), . . . , T(2,ss2), . . . , T(2,SS2). Subset SS(p) comprises SSp pagers, including pagers T(p,1), T(p,2), . . . , T(p,ssp), . . . , T(p,SSp). Subset SS(P) comprises SSP pagers, including pagers T(P,1), T(P,2), . . . , T(P,ssP), . . . , T(P,SSP).

Each collection period CP of batch session 4-2 of FIG. 6 is divided into a synchronization period SP(p), a listen period LP(p) and an acknowledge period AP(p). Thus the collection periods CP(1), CP(2), . . . , CP(p), . . . , CP(P) have synchronization periods SP(1), SP(2), . . . , SP(p), . . . , SP(P), listen periods LP(1), LP(2), . . . , LP(p), . . . , LP(P) and acknowledge periods AP(1), AP(2), . . . , AP(p), . . . , AP(P), respectively. A typical collection period CP(p) having a synchronization period SP(p), a listen period LP(p) and an acknowledge period AP(p) is shown as collection period 4-3 in FIG. 6. In the example described, each listen period LP(p) precedes the acknowledge period AP(p) in the batch collection period CP(p) so that the collection function is separated from the acknowledge function. Each listen period LP(p) is proceeded by a synchronization period SP(p) for synchronizing the pagers 8 of FIG. 3 for that collection period.

The synchronization period SP(p) is shown in more detail as 4-4 in FIG. 6. The synchronization period SP(p) includes an interrogator preamble field, IPp, a command field CDp, and an argument field ARp.

The preamble field IPp is sent at the beginning of the synchronization period and consists of, in one example, 12 pulses where 11 of the pulses are of 50 microsecond duration repeated at 125 microsecond intervals. The 12th pulse in the preferred embodiment is 110 microseconds in duration, serving to identify the preamble as being from the interrogator of the preferred embodiment. Other durations of the final or of one or more of the intermediate pulses may be used in alternate embodiments and constitute means to identify the preamble source and therefore the source of the subsequent data.

The command field CDp and argument field ARp of 4-4 in FIG. 6, in one particular embodiment, are comprised of 8-bit bytes having 7 bits of code and one bit of parity. The command field CDp defines the command that is sent from an interrogator 7 to the pagers 8. The argument field ARp may be associated with a particular command and will comprise differing numbers of bytes corresponding to the command type and may carry the address (ID code) of a pager or other information.

An example of a command instruction set and the corresponding argument fields for the preferred embodiment appear in the following TABLE 1. In TABLE 1, the commands are of two types, namely, one-to-many commands or "broadcast commands" that are commands broadcast for execution by all awake pagers and one-to-one commands or "directed commands" that are commands directed to an addressed pager for execution. The HELLO, ALL_SLEEP, and INTERRUPT_HELLO commands are broadcast commands and all other commands are directed commands. Of course, additional broadcast commands or directed commands can be added to TABLE 1 if desired.

The interrogator processor accesses the interrogator memory to process the interrogator sequencing code to first send a broadcast command and subsequently to send a directed command. With this broadcast command and subsequent directed command sequencing, efficient communication between many pagers and an interrogator is achieved.

Each pager processor processes the pager sequencing code in response to the broadcast command and the directed command. As part of the sequencing, each pager returns a unique communication to the interrogator including the pager ID.

In FIG. 6 and referring to collection period 4-3 of FIG. 6, the synchronization period SP(p) is followed by a pager command selected from the instruction set of TABLE 1 to command the pagers to perform a function. For the inventory function, the HELLO and SET_WINDOW commands are broadcast commands that function to initiate the collection of the ID codes from all pagers within range of the interrogator. The HELLO and SET_WINDOW commands instruct all pagers to report their pager ID's to the interrogator and to subsequently resume the sleep (low-power) state. These broadcast commands are examples of one-to-many command operations, that is, communication from one interrogator to many pagers. The ALL_SLEEP command is a broadcast command that directs all awake pagers except the pager identified by the argument field (the argument field includes the pager ID code) to resume the sleep state and directs the identified (addressed) pager to remain enabled to receive a subsequent directed command, for example, a BEEP_ON command. The ALL_SLEEP command is an example of a broadcast one-to-many communication that is typically followed by a one-to-one communication such as BEEP_ON command.

Other commands shown in TABLE 1 are commands directed to a specific addressed pager. For example, the SQUAWK command directs a specific pager to transfer the data from a specific portion of the pager memory to the interrogator.

is typical and is a time period provided for one pager 8 of FIG. 3 to communicate with the interrogator 7 of FIG. 3. If more than one pager attempts to communicate during a time period such as TS(p,dp), a communication collision may occur that will defeat the successful pager-to-interrogator communication for one or more of the colliding pagers.

The communication times of the pagers 8 are distributed over the Dp time periods of listen period 4-5 of FIG. 6 so as to reduce the number of collisions that occur. However, in general it may be expected that some pagers may not successfully communicate during any particular listen period LP(p). The larger the number Dp of time periods relative to the number T of pagers 8 attempting to communicate, the more likely that successful communication occurs during a listen period. The larger the number Dp, however, the longer the time required to take inventory of the pagers 8. For battery operated pagers, the longer the communication time, the more battery power required. Thus a balance between the number of time periods allocated and the number of pagers in the system is required for efficient operation. In actual practice it has been observed that the most efficient operation is attained when the number Dp of time periods is equal to the number T of expected pagers.

The algorithms used to determine the distribution of the communication times allocated to pagers over the time periods are also important to system operation.

TABLE 1

| Code | Name | Arguments | Description |
|---|---|---|---|
| 00000000 | HELLO | None | Initiate collection of all awake pagers using default listen period. |
| 11000011 | SLEEP | 3 byte ID | Instructs the addressed pager that it has been heard and that it can go to sleep. |
| 11000101 | BEEP_ON | 3 byte ID | Instructs the addressed pager to turn on the audible alarm. Returns: Pager ID plus status code. |
| 11000110 | BEEP_OFF | 3 byte ID | Instructs the addressed pager to turn off the audible alarm. Returns: Pager ID plus status code. |
| 11001001 | PLACE | 3 byte ID + count N + address (M) + N bytes of data + parity byte | Store N bytes in EEPROM of addressed pager starting at addr M. Returns: Pager ID plus status code. |
| 11010010 | SQUAWK | 3 byte ID + counter (N) + address (M) | Retrieve N bytes from addressed pager EEPROM starting at address M. Returns: Pager ID + N bytes of data + parity byte covering the data. |
| 11011011 | ALL_SLEEP | 3 byte ID | Puts all awake pagers to sleep except the one with the specified ID. |
| 11001100 | CHECK_IN | 3 byte ID | Instructs the addressed pager to return its ID and status bytes. |
| 10001110 | SET_WINDOW | Byte N | Set listen window in all pagers to N times 55 msec. Default N = 1. Command initiates a hello cycle. |
| 11010001 | GET_VERSION | 3 byte ID | Instructs addressed pager to return its ID and version byte. |
| 11010100 | WRITE_PORT_B | 3 byte ID + data byte | Writes a byte to Port B of addressed pager. Returns: Pager ID. |
| 11011001 | READ_PORT_A | 3 byte ID | Reads Port A of addressed pager. Returns: Pager ID + Port A. |
| 00000011 | INTERRUPT_HELLO | None | Hello directed to all pagers that have the Int A in the status byte set. Returns: Pager ID. |
| 11011010 | GET_ERROR | 3 byte ID | Get error vector from addressed pager. Returns: Pager ID + error byte. |

In the inventory function, the synchronization period SP(p) of 4-3 in FIG. 6 is followed by the listen period LP(p) of 4-3. A typical one of listen periods LP(p), shown in further detail in 4-5 of FIG. 6, comprises a plurality Dp of diverse communication periods (time periods) TS which, in the embodiment described, are time periods TS(p,1), TS(p, 2), . . . , TS(p,dp), . . . , TS(p,Dp). The time period TS(p,dp)

A typical one of the time periods TS(p,dp) is shown in 4-6 of FIG. 6. A communication from a pager during the TS(p,dp) time period includes a pager preamble TPp, a pager identifier IDp, and a data field DAp.

The pager preamble TPp is sent by a pager at the beginning of the time period to which the particular pager has been allocated. In one example, the preamble consists of 12 pulses of which the first 11 are 50 microsecond in duration, repeated at 125 microsecond intervals. The 12th pulse in the preferred embodiment is 70 microseconds in duration, serving to identify the preamble as being from the pager of the preferred embodiment. Other durations of the final or of one or more of the intermediate pulses may be used in alternate embodiments and constitute means to identify the preamble source and therefore the source of the subsequent data.

The pager identifier IDp, in one embodiment, is a 24-bit field comprising 20 ID bits and a 4-bit format field. The format field is used to identify the nature of the pager and/or the nature of data that follows in the data field DAp. The data field may include, for example, status information indicating conditions of the pagers such as low battery, audible alarms on or off, interrupt levels or may include information as to the data contained within memory 19 of FIG. 5, the nature of connected I/O devices and other information or data associated with data transfers between the pager 8 and the interrogator 7.

By way of example, referring to FIG. 5, one of the I/O units 18 may be a temperature monitoring device which provides temperatures to the pager 8 to be recorded by the pager for transmission to the interrogator 7 of FIG. 3. In such a case, the nature and format of the data is specified in the format field with any data to be transferred to the interrogator carried in the DAp field. Similarly, if the I/O unit 18 is an RS232 port, such a port and the data format is specified in the format field and the data to be transferred to the interrogator carried in the DAp field. Many different data formats and I/O units are possible in accordance with applications of the present invention.

For each of the plurality SSp pagers of subset SS(p) that are successful in communicating as part of the batch collection protocol during the listen period IP(p), an acknowledge signal is sent only once and only during the immediately following acknowledge period, AP s). Each of the SSp pagers of the subset of pagers SS(p) is allocated a separate communication channel that, in the embodiment described, is a separate acknowledge time period during the acknowledge period, AP(p). More specifically, during the acknowledge period AP(1), the subset SS(1) has acknowledge signals AS(1,1), AS(1,2), . . . , AS(1,ss1), . . . , AS(1,SS1) that correspond to the pagers of subset SS(1), namely, pagers T(1,1), T(1,2), . . . , T(1,ss1), . . . , T(1,SS1). During the acknowledge period AP(2), the subset SS(2) has acknowledge signals AS(2,1), AS(2,2), . . . , AS(2,ss2), . . . , AS(2,SS2) that correspond to the pagers of subset SS(2), namely, pagers T(2,1), T(2,2), . . . , T(2,ss2), . . . , T(2,SS2). During the acknowledge period AP(P), the subset SS(P) has acknowledge signals AS(P,1), AS(P,2), . . . , AS(P,ssP), . . . , AS(P,SSP) that correspond to the pagers of subset SS(P), namely, pagers T(P,1), T(P,2), . . . , ssP), T(P,SSP).

FIG. 5—Batch Collection Period Matching

Figure 7:
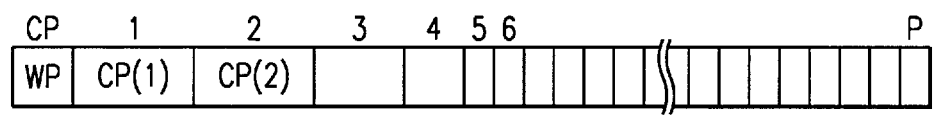
FIG. 7 is a schematic timing diagram showing further detail of the FIG. 6 timing.

In FIG. 7, further details of the batch session period of FIG. 6 are described. Specifically, the batch session includes the P collection periods CP(1), . . . , CP(P). In a preferred embodiment, these collection periods are not all of equal duration and the performance of the collection protocol is enhanced by matching the duration of each of the collection periods to the expected number of pagers that are likely to respond during each of the collection periods.

More specifically, in one example of the operation of a batch session, the wake-up command during the wake-up period WP is communicated to all of the pagers 8 in the communication region 9 of FIG. 3. All of the pagers of region 9 wake up in response to a wake-up signal during the wake-up period, WP, and responsively are programmed to transmit during the listen period LP(1) of FIG. 6-3 on receipt of the synchronization command CD(1) of FIG. 6-4 sent during the synchronization period SP(1) of FIG. 6-3.

The duration of the listen period LP(1) is longer than the duration of subsequent listen periods because it can be expected that the largest number of pagers will be attempting to communicate during the collection period CP(1). In one particular embodiment, the duration of listen period LP(1) is made approximately equal to XR times T, where XR is the time required for transmission of a response by a pager, shown as 4-6 of FIG. 4, approximately 6 milliseconds in a preferred embodiment, and T is the total number of pagers in the communication region 9 of FIG. 3.

In one example, the T pagers 8 have response times distributed, generally randomly, over the listen period LP(1). With such a distribution, it is generally expected that approximately 60% of the pagers will successfully communicate without collision with other pagers during the CP(1) collection period. These successful pagers constitute the subset SS(1).

During CP(1), acknowledge signals are sent to the successfully communicating pagers so that the SS(1) subset of pagers which successfully communicate during CP(1) do not attempt to communicate during CP(2) and the subsequent collection periods. As indicated in the collection period representation of FIG. 7, the duration of the CP(2) collection period is approximately one-half the duration of CP(1), therefore, the duration of listen period LP(2) is equal to approximately one half of LP(1), the duration of the listen period of CP(1).

During the LP(2) listen period of the collection period CP(2), only approximately 40% of the original T pagers attempt to communicate with the interrogator 7 of FIG. 3 since the other approximately 60% were successful during the CP(1) collection period and hence have been removed from further communication. During CP(2), approximately 75% of the remaining pagers attempting communication are successful and these pagers, designated as the SS(2) subset, are then acknowledged during the AP(2) acknowledge period and are removed as pagers that try to communicate with the interrogator in subsequent collection periods. After CP(2), approximately 10% of the T pagers remain to communicate.

The CP(3) collection period as indicated in FIG. 7, is once again approximately half as long as CP(2) and the duration of time available for communication in CP(3) is approximately one half of LP(2). During CP(3) about 75% of the remaining pagers successfully communicate and are acknowledged, leaving again a still smaller number of the original T pagers to be collected.

In a similar manner, one or more of the collection periods CP(4), CP(5) and CP(6) follow, each period contributing a percenpagere of the remaining pagers. Eventually, by the CP(P) collection period, all pagers are collected that is, all pagers 8 have sent a pager identifier to interrogator 7, have received back an acknowledge signal and have returned to the sleep state. Normal operation of the batch collection process will have collected all pagers within a lesser number of collection periods than the limit P. In one preferred embodiment, the limit P is equal to 20, however, it has been observed that typically all pagers are collected within 5 or less collection periods.

The example described in connection with FIG. 7 employs one method where a plurality of batch collecting periods CP are each determined to match the collection period bandwidth to the probable number of responding communication pagers during each collection period. With such a matching, the whole batch session, including the plurality of collection periods CP(1), ..., CP(P), is efficient in collecting pager communications whereby an inventory of the pagers 8 present in the communication region 9 of FIG. 3 is efficiently made.

The method employed is an algorithm in which the bandwidth (control period duration) is reduced for each succeeding collection period down to a minimum collection period and thereafter the collection periods are of constant duration. Of course, other algorithms for matching the collection period bandwidth to the number of transmitting pagers may be employed.

In one alternative example, the interrogator may partition the pagers into groups based upon unique pager ID's and permit responses only a group at a time. In another alternative example, the interrogator may partition the pagers into groups based upon unique pager ID's and permit responses by each group to be over different frequency channels. Each of these alternatives, however, is more expensive than the embodiment described above.

While the size of the subsequent collection periods after the first may be repeatedly reduced in duration, it has been found that continued reductions in duration after a number of initial reductions are not required in that the final collection periods may be set to a fixed, short duration.

While it is possible to lengthen the time duration of each of the collection periods to possibly collect, for example, 100% of the pagers in fewer collection periods, in actual practice it has been found that the most effective manner to collect the pagers is to use shorter periods and take advantage of diversity of antennae to collect those pagers which do not have optimum reception by one of the antennae.

Sequenced Operation of Sessions

LIST 1, LIST 2, LIST 3 and LIST 4 are tables representing the sequenced operation of communication sessions executed by an interrogator 7 and pagers 8. The Pager INVENTORY session and the POLL PagerS sessions executed by LIST 1 and LIST 2 are two examples of the sessions and each of these sessions employ the batch collection protocol. The Pager INVENTORY session is initiated by the interrogator to wake-up and identify each pager that is within the communication region.

The POLL PagerS session is initiated by the interrogator to identify each pager that is awake in the communication region where the pager has been awakened through initiation of the pager rather than the interrogator. This process occurs when the interrupt input 32 of FIG. 5 is activated by the external unit 29 of FIG. 5. The Pager INVENTORY session and the POLL PagerS sessions are examples and many other sessions are possible.

LIST 3 is an example of a one-to-many followed by a one-to-one communication where the interrogator and pager function to execute a particular one of the commands of TABLE 1 to energize a beeper in a particular pager, although similar processing may be executed for other commands. LIST 3 is representative of the general processing for many different commands of which the beeping function is but one example.

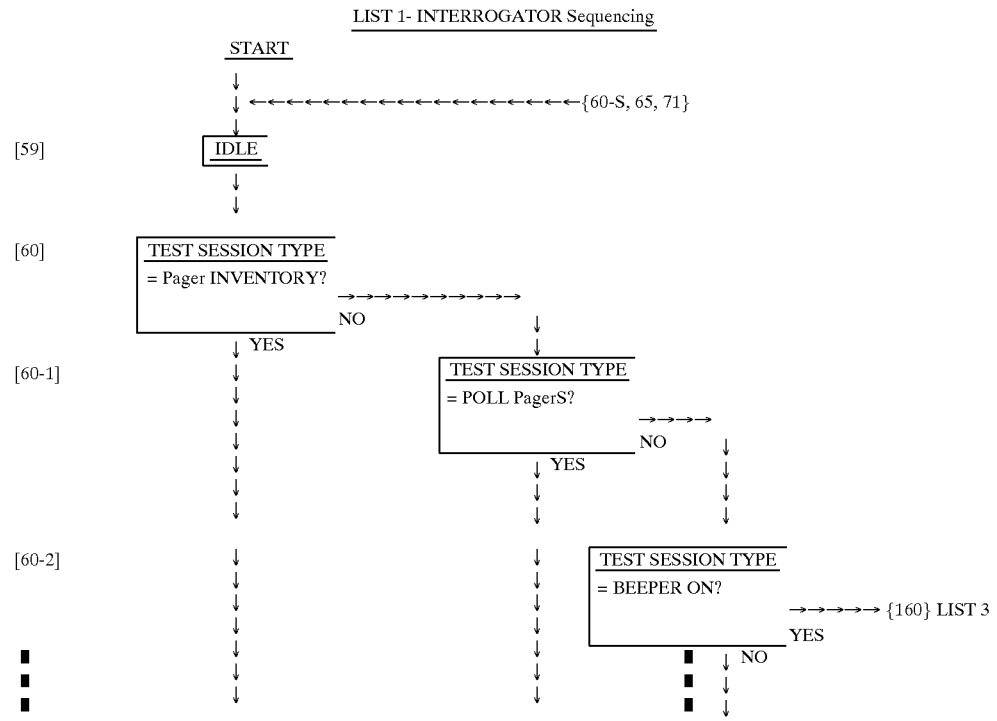

-continued
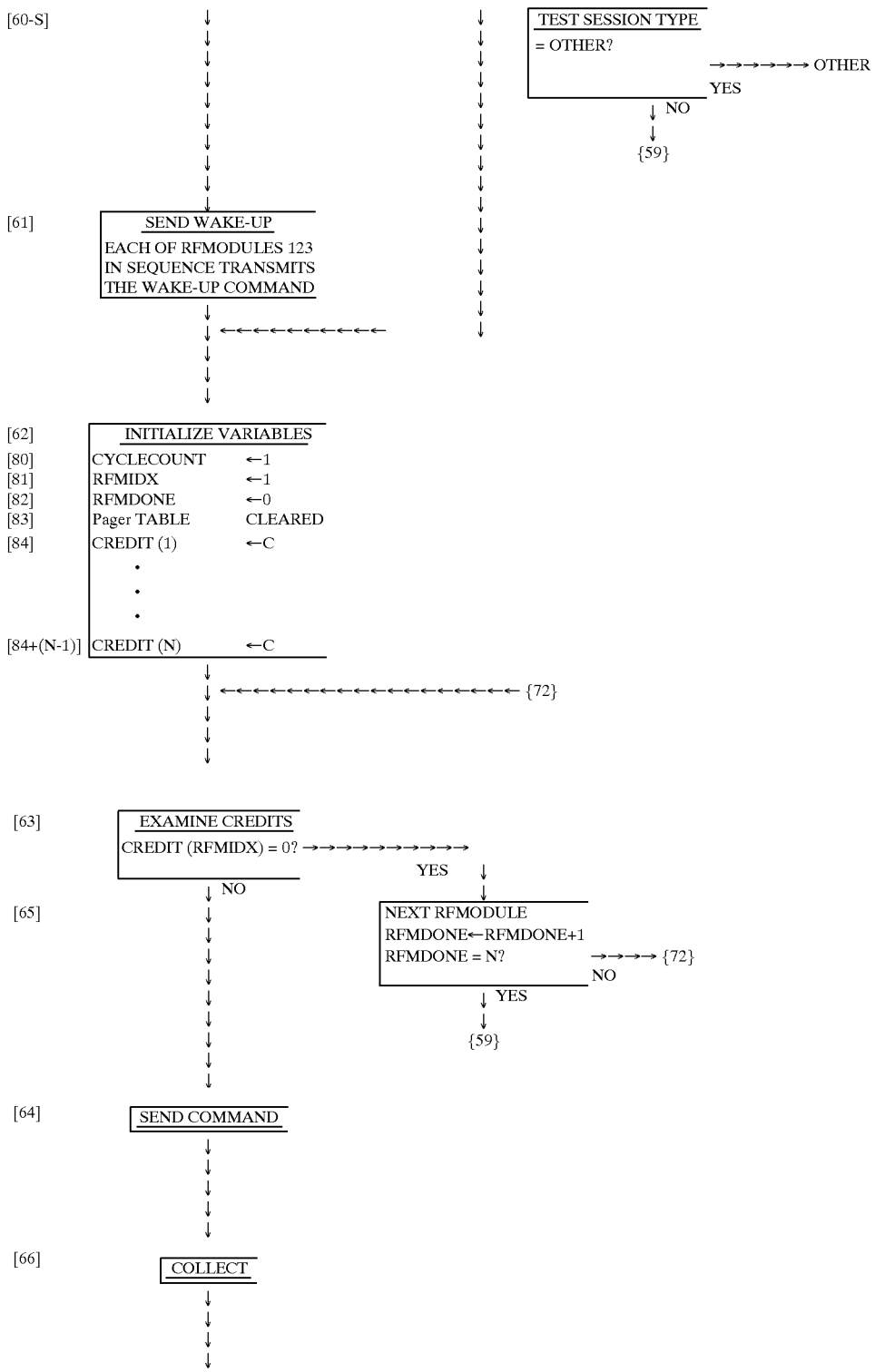

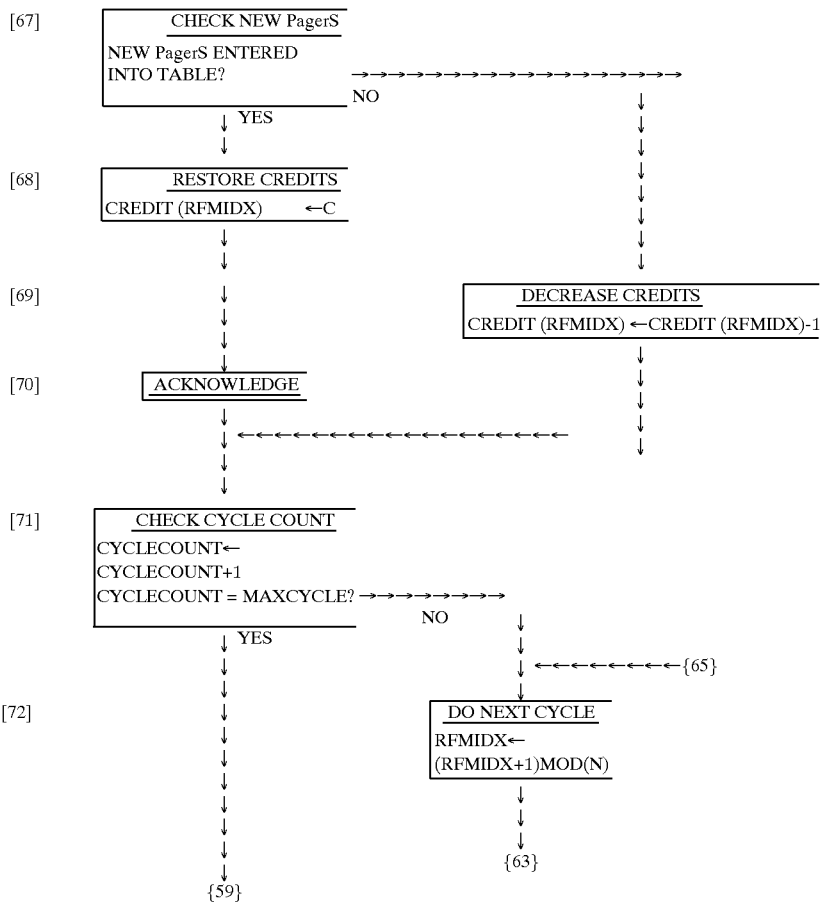
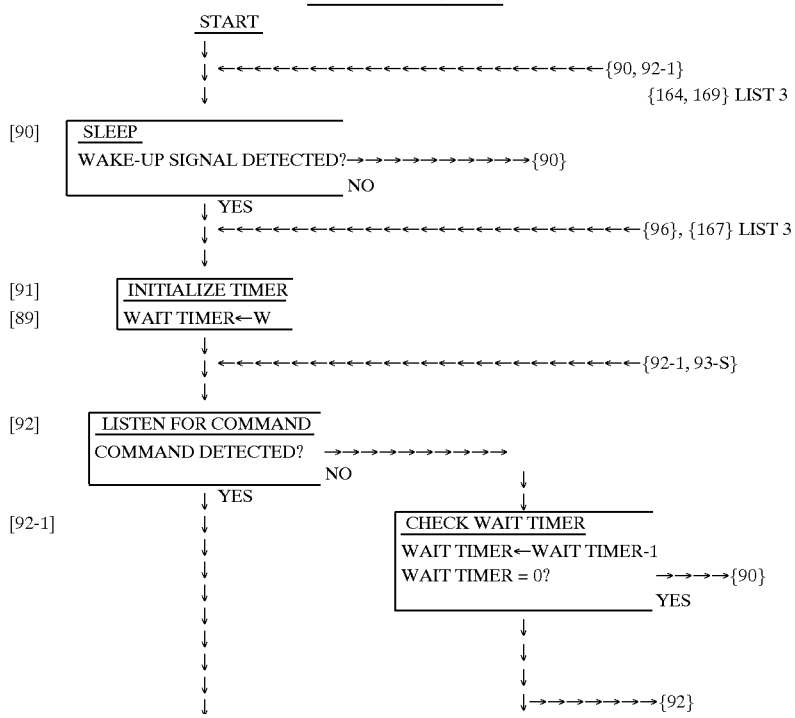

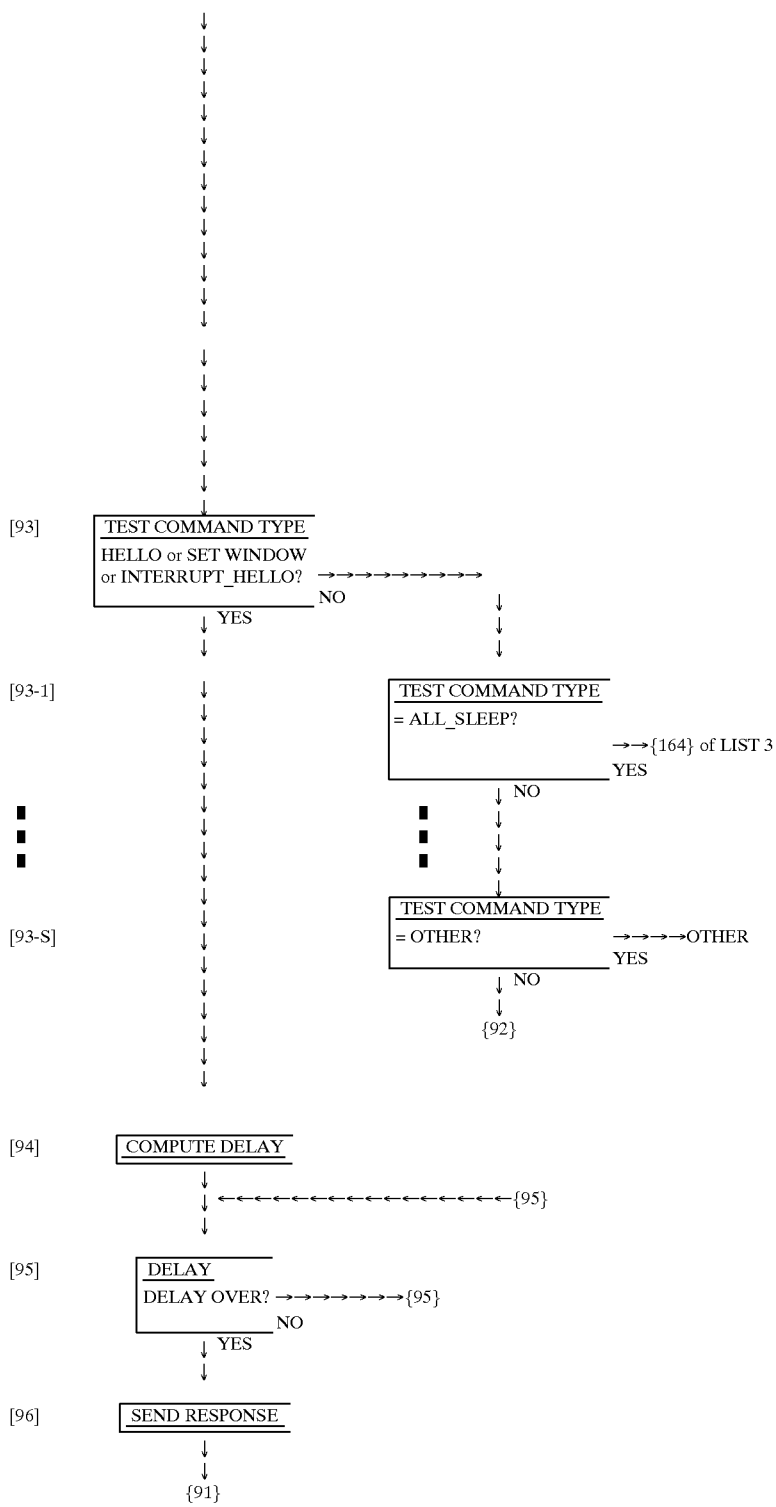

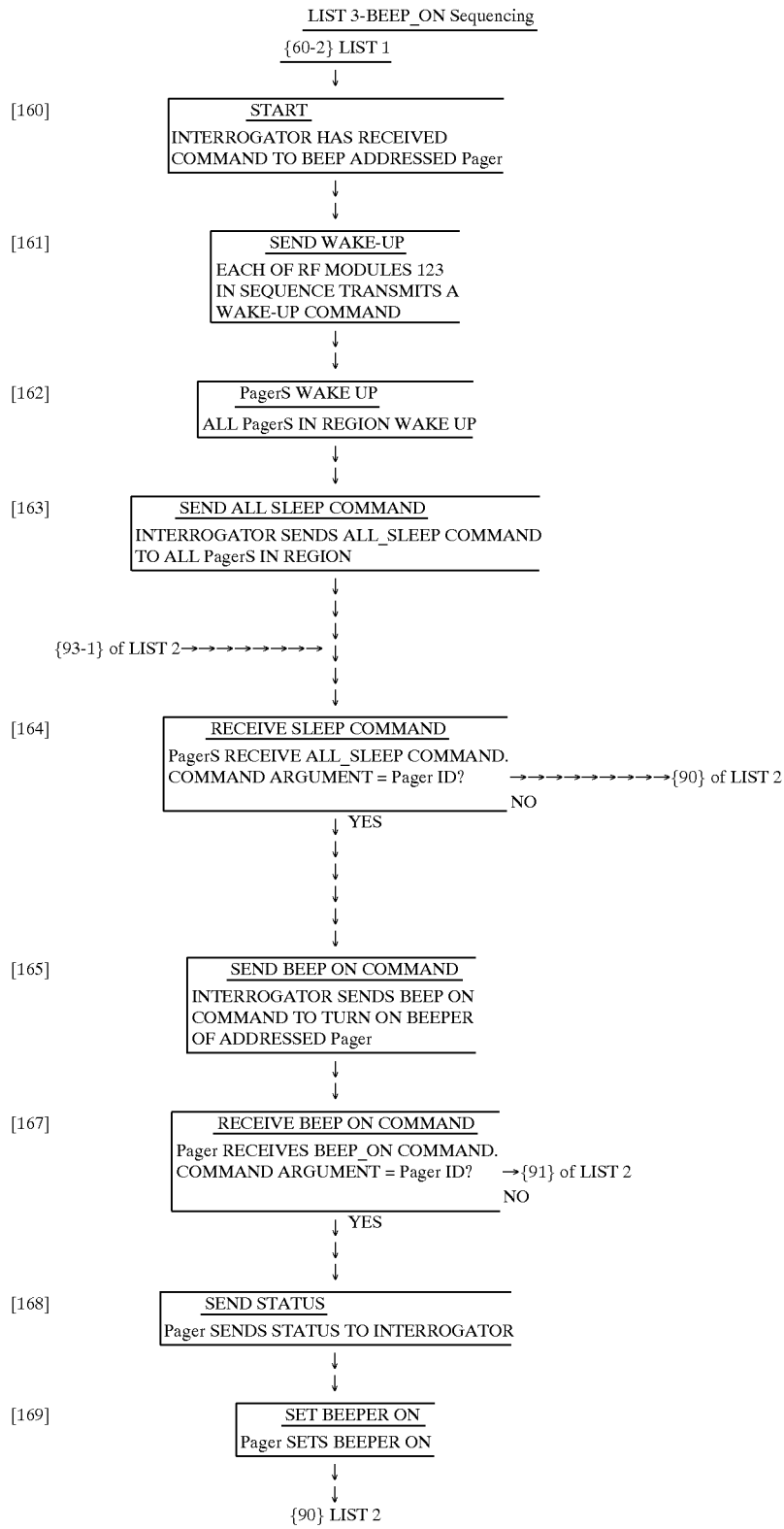

INTERROGATOR STATE 59. Referring to FIG. 4 and LIST 1, the IDLE state 59 represents the idle state of the interrogator 7. From this state, the interrogator commences different operations that are executed as sessions. The IDLE state is implemented in a conventional manner in the processor 102 of FIG. 4. For example, processor 102 executes an idle loop that branches when an operation, such as pager inventory, is to be started. Pager inventory is one of the significant operations of the invention but many other operations are possible. Other operations include servicing I/O units 118, communicating with pagers 8 to enable pager functions, for example, sound generation such as energizing a beeper in a particular pager, or communicating with external systems.

In one preferred embodiment, interface unit 110, connected to a computer via a network, initiates the operations to be performed by the interrogator 7. The communication system remains in the idle state until a request from the network 41 initiates a session for performing some operation. Upon receiving a request, the processing in the interrogator 7 passes from IDLE state 59 to TEST SESSION TYPE state 60.

INTERROGATOR STATE 60, 60-1, . . . , 60-S. In state 60, interrogator 7 tests to determine the type of session to be executed. State 60 first tests to determine if a Pager INVENTORY operation is to be performed. Assuming a Pager INVENTORY operation is to be performed, a YES result of the test sends the processing to SEND WAKE-UP state 61. Assuming a Pager INVENTORY operation is not to be performed, a NO result of the test sends the processing to the next TEST SESSION TYPE state 60-1.

The TEST SESSION TYPE state 60-1 tests to determine if a POLL PagerS session is to be performed. Assuming a POLL PagerS operation is to be performed, a YES result of the test sends the processing to the INITALZE VARIABLES state 62. A NO result of the test sends the processing to the next TEST SESSION TYPE state 60-2.

The TEST SESSION TYPE state 60-2 again is a test for a particular session type. A YES response will send the processing to the particular sequence, a NO response will continue the test for session type. One of the possible sessions is the sequence to activate the beeper in the pager. In the example shown, a BEEPER ON operation is to be performed, hence a YES result of the test sends the processing to LIST 3 state 160. A different required session will return a NO result of the test, sending the processing to the next TEST SESSION TYPE state.

The test session processing continues for any number S of TEST SESSION TYPE tests up to TEST SESSION TYPE state 60-S. While LIST 1 has included serial testing in order to determine the session to be executed, other ways of determining sessions can be employed. For example, condition code branching, vectoring, or table look-up methods can be used.

For purposes of explanation of the batch collection process, assume now that interrogator 7 has received a request for a Pager INVENTORY session from computer 40 via interface unit 110. Processing after leaving the IDLE state 59 advances to TEST SESSION state 60 and then to the SEND WAKE-UP state 61.

Batch Collection Inventory Sessions

Referring to FIGS. 1, 2, and 3 and to LIST 1 and LIST 2, in accordance with the present invention, batch collection and other protocols are one-to-many processes employed during sessions when communication occurs between the interrogator 7 and the pagers 8 in an environment where multiple pagers may attempt to communicate simultaneously with interrogator 7. The following description applies to the batch collection process as implemented to perform Pager INVENTORY in the preferred embodiment.

INTERROGATOR STATE 61. For Pager INVENTORY using batch collection and for many other sessions, the constant interrogation of all pagers within radio range of the interrogator 7 (or other operation requiring high-power consumption by the pagers) is not desired. Low-power operation is important for battery-operated pagers to extend battery life in the pagers. In the present example, it is assumed that all pagers normally are in a low-power standby mode (sleep mode) and are awakened and interrogated only as the need arises.

In SEND WAKE-UP state 61, the interrogator transmits a WAKE-UP signal to wake-up sleeping pagers. For multiple modules 12-1, . . . , 123-N in the interrogator 7, a WAKE-UP signal is sent from each of the RF modules 123-1, . . . , 123-N in sequence. In the preferred embodiment, the WAKE-UP signal comprises a VHF radio signal modulated at 30.5 Khz, sent for a period of 3.492 seconds. By using a plurality of RF modules 123 and hence the associated plurality of antennas 121, advantage is taken of the antenna diversity previously discussed, providing to all pagers within range the opportunity for optimum reception of the WAKE-UP signal from one of the modules 123. After having sent the plurality of WAKE-UP signals as described, the interrogator advances to INITIALIZE VARIABLES state 62.

INTERROGATOR STATE 62. In INITALZE VARIABLES state 62 the contents of variable CYCLECOUNT 80 are initialized to 1, the contents of index variable RFMIDX 81 are initialized to 1 and the contents of variable RFMDONE 82 are initialized to 0. The contents of table Pager TABLE 83 are cleared and the contents of variables CREDIT(1) 84, . . . , CREDIT(N) 84+(N−1) are each initialized to a predetermined value C. In the preferred embodiment, the value C equals 3. In the preferred embodiment, the quantity N is equal to 3 and is the number of RF modules installed in the interrogator 7. The interrogator next advances to EXAMINE CREDITS state 63.

Pager STATE 90. Referring now to FIG. 5 and LIST 2, the pagers 8 are quiescent in the low-power sleep mode in SLEEP state 90. The strobe 16 functions to cause receiver 1 to sample the ambient radio energy for the duration of the strobe pulse width every strobe period, in the preferred embodiment the sampling is for three milliseconds every three seconds. If the wake-up signal energy is not present, the pager maintains the sleep mode. If the wake-up signal energy is present, the RF receiver 1 and wake-up detector 4 function to activate the processor 2. The processor 2 awakens the pager from its low-power state and the pager advances to INITIALIZE TIMER state 91.

Pager STATE 91. In INITIALIZE TIMER state 91, the pager initializes variable WAIT TIMER 89 to the value W where W has a value of 30 seconds in the preferred embodiment. The pager continues to LISTEN FOR COMMAND state 92.

Pager STATE 92. In LISTEN FOR COMMAND state 92, the pager checks for the presence of a command from the interrogator. If a command has been received, the pager advances to TEST COMMAND TYPE state 93. If a command is not present, the pager advances to CHECK WAIT TIMER state 92-1.

Pager STATE 92-1. In CHECK WAIT TIMER state 92-1, the variable WAIT TIME 89 is decreased by one count.

If the variable equals zero, this condition indicates that the pager has not detected a command from the interrogator, most probably because the pager is too distant from the interrogator to detect the command and that therefore there is no reason for the pager to continue listening. The pager branches to SLEEP state 90 resuming the sleep mode.

If the variable is greater than zero, this condition indicates that there still exists time for a command to be received and the pager remains in LISTEN FOR COMMAND state 92.

INTERROGATOR STATE 63. Referring to FIG. 4 and LIST 1, the interrogator in EXAMINE CREDITS state 63 examines the variable CREDIT(RFMIDX) 84+(RFMIDX).

If the variable is greater than zero, this condition means either that this is the first time in the current batch collection process that the particular RF module 123-RFMIDX is to be used for communication with the pagers or that at least one of the previous N commands for the RF module 123-RFMIDX was successful in collecting pagers. In either of these cases, the interrogator advances to SEND COMMAND state 64.

If the variable is equal to zero, that condition means that for N consecutive command transmissions from RF module 123-RFMIDX, no pagers have responded in which case the interrogator advances to NEXT RFMODULE state 65.

INTERROGATOR STATE 64. In SEND COMMAND state 64, the interrogator sends a command. In the inventory batch collection process, the command is one of the HELLO or SET_WINDOW commands of TABLE 1 and defines the LISTEN period duration. The duration of the LISTEN period is determined by accessing an array indexed by the contents of variable CYCLECOUNT 80. From the array, the interrogator obtains a value for the duration of the LISTEN period. The array has been preloaded with values related to the number of pagers expected in the range of the interrogator, the preloaded values having been installed either at the time of system installation or by computer 40 via network 41. This code together with the processor is bandwidth code and is means for controlling the bandwidth of the collection periods. The bandwidth code sets the bandwidth of each collection period by setting the duration of each of the respective listen periods.

In the preferred embodiments, the maximum one of the values is 6840 milliseconds, with the remaining values decreasing in a manner such that progressive values are approximately one-half the previous value, reaching a limit value of 285 milliseconds. In the preferred embodiments, the array is arranged such that progressively smaller values are loaded at progressively larger index positions in the array. In other embodiments, other values may be used for the LISTEN period durations where such selection of values is dependent on the number of pagers expected to be in the range of the interrogator or is determined by the host system after analysis of pager collection statistics.

The interrogator sends a command to all pagers using RF module 123-RFMIDX, prefixed by a preamble. The preamble in the preferred embodiment is a series of 50 microsecond duration pulses, repeated at 125 microsecond intervals. The preferred data format of commands, and all other data exchanges, is a pulse-width modulated code configured with 90 or 50 microsecond pulses and 35 microsecond spaces. Other preamble and data exchange formats can also be used with the present invention.

After sending a command, the interrogator advances to COLLECT state 66.

INTERROGATOR STATE 65. In NEXT RFMODULE state 65, the variable RFMDONE 82 is increased by one count and compared to the limit N. In the preferred embodiment, N is equal to three, the quantity of RF modules installed in the system.

If the variable is equal to the limit, the interrogator has completed the requisite batch collection periods and is to return to IDLE state 59.

If the variable is less than the limit, the interrogator returns to EXAMINE CREDITS state 63.

Pager STATE 93, 93-1, . . . , 93-S. Referring now to FIG. 5 and LIST 2, the pager enters TEST COMMAND TYPE state 93 having detected the receipt of a command. In state 93, the pager tests to determine the type of command that has been received. State 93 first tests to determine if a HELLO or SET_WINDOW command has been received. Assuming a HELLO or SET_WINDOW command has been received, a YES result of the test sends the pager to COMPUTE DELAY state 94. Assuming a HELLO or SET_WINDOW was not received, a NO result of the test sends the processing to the next TEST COMMAND TYPE state 93-1.

The TEST COMMAND TYPE state 93-1 tests to determine if an ALL_SLEEP command has been received. Assuming an ALL_SLEEP command has been received, a YES result of the test sends the processing to RECEIVE SLEEP state 164 of LIST 3. A NO result of the test sends the processing to the next TEST COMMAND TYPE state 93-2.

The test command processing continues for any number S of TEST COMMAND TYPE tests up to TEST COMMAND TYPE state 93-S. While LIST 2 has included serial testing in a certain typical sequence in order to determine the session to be executed, other ways of determining sessions can be employed. For example, different sequences of command testing, condition code branching, vectoring, table look-up or other methods can be used.

For purposes of explaining the batch collection process, it is assumed that pager 8 has received a HELLO or SET_WINDOW broadcast command from the interrogator, in which event, the pager advances to COMPUTE DELAY state 94.

Pager STATE 94. The pager enters COMPUTE DELAY state 94 having detected a HELLO, SET_WINDOW or INTERRUPT_HELLO command. If the command is the SET_WINDOW command, the pager stores the LISTEN time value accompanying the command and then computes a time delay value for the response. If the command is a HELLO or INTERRUPT_HELLO command, the pager computes the time delay value for the response using the default LISTEN time value, in the preferred embodiment the default time value is 285 milliseconds.

On the first SET_WINDOW command received by the pager after the WAKE-UP command, the delay is computed associating the pager address code (pager ID) with the LISTEN duration value. In the preferred embodiment, this association is a hash algorithm manipulation of the pager address (pager ID).

After the first SET_WINDOW command that the pager receives after the WAKE-UP or on receipt of a HELLO or INTERRUPT_HELLO command, the pager chooses a random time delay within the LISTEN time. In the preferred embodiment, the internal clock of the processor 2 of each pager 8 is used as a randomizing element for the pager.

When the delay has been computed as described above, the pager advances to DELAY state 95.

Pager STATE 95. In DELAY state 95, the pager waits its chosen time delay and then advances to SEND RESPONSE state 96.

Pager STATE 96. In SEND RESPONSE state 96, the pager sends its address code (pager ID), prefixed with a preamble, back to the interrogator. The response comprises a preamble, the pager address (ID code) and status code information. The preamble is in the preferred embodiment a series of 50 microsecond duration pulses, repeated at 125 microsecond intervals. The preferred data format of the address, and all other data exchanges, is a pulse-width modulated code configured with 90 or 50 microsecond pulses and 35 microsecond spaces. The pager status code information may include information as to the battery state, beeper state (on or off), interrupt level or other information. Additional data may be sent to the interrogator as data bytes in the format described according to command type as indicated in TABLE 1. The pager then advances to INITIALIZE TIMER state 91 to await further communication from the interrogator.

INTERROGATOR STATE 66. Referring again to FIG. 4 and LIST 1, the interrogator in COLLECT state 66 enables all RF receivers 101 so as to receive pager responses with the maximum diversity possible. When a pager preamble is detected, the interrogator determines the optimum one of the RF modules 123, based on the signal strength from the RF receivers 101 using the ADC converter 140. The interrogator then disables all but the optimum antenna and receives the pager address code, placing the pager code in table Pager TABLE 83 at the position indexed by the pager address. Also placed at the table position is the signal strength indication and other status information. If the data is received in error, the data is discarded. The interrogator enables now all RF modules 123 and again continues in COLLECT state 66, listening for pager response. The interrogator remains in COLLECT state 66 until the LISTEN period expires, at which time the interrogator advances to CHECK NEW PagerS state 67.

INTERROGATOR STATE 67. Referring to FIG. 4 and LIST 1, the interrogator, in CHECK NEW PagerS state 67, examines the table Pager TABLE 83. All pagers that respond to the broadcast command sent in SEND COMMAND state 64 will have been entered into table Pager TABLE 83 in COLLECT state 66.

If any additional pagers were entered into the table in COLLECT state 66, the interrogator advances to RESTORE CREDITS state 68.

If no additional pagers were entered into the table during COLLECT state 66, the interrogator branches to DECREASE CREDITS state 69 wherein the contents of variable CREDIT(RFMIDX) 84+(RFMIDX−1) is decreased one count. The interrogator then advances to CHECK CYCLE COUNT state 71.

INTERROGATOR STATE 68. In RESTORE CREDITS state 68, the contents of variable CREDIT(RFMIDX) 84+(RFMIDX−1) are initialized to the initial value C to indicate that new pagers have responded to transmission from RF module 123-RFMIDX and that collections are to continue using this RF module. The interrogator then advances to ACKNOWLEDGE state 70.

INTERROGATOR STATE 69. In DECREASE CREDITS state 69, no additional pagers were entered into the table during the COLLECT state 66. The contents of variable CREDIT(RFMIDX) 84+(RFMWX−1) are decreased by one. The interrogator then advances to CHECK CYCLE COUNT state 71.

INTERROGATOR STATE 70. In ACKNOWLEDGE state 70, since new pagers were entered into the table Pager TABLE 83 during the COLLECT state 66, all such new pagers are sequentially each sent an ACKNOWLEDGE command, in the inventory function a directed command, specifically the SLEEP command of TABLE 1. The interrogator then advances to CHECK CYCLE COUNT state 71.

INTERROGATOR STATE 71. The interrogator in CHECK CYCLE COUNT state 71 increases variable CYCLE COUNT 80 by one count. The value of variable CYCLE COUNT 80 is then compared with the limit ENDCYCLE. In the preferred embodiment, ENDCYCLE is equal to 20.

If the variable is equal to the limit, the interrogator has completed the requisite number of batch collection periods. The interrogator returns to IDLE state 59.

If the variable is less than the limit, the interrogator branches to DO NEXT CYCLE state 72.

INTERROGATOR STATE 72. The interrogator in DO NEXT CYCLE state 72 increases the contents of index variable RFMWX 81 by one count in a modular manner. The modular limit N is equal to the number of RF modules 123 installed in the system, N=3 in the preferred embodiment. The interrogator then returns to EXAMINE CREDITS state 63 to begin another batch collection period of the current batch collection session and processing repeats as previously described.

POLL PagerS Session

Referring again to FIGS. 1, 2, and 3 and to LIST 1 and LIST 2, in accordance with the present invention, batch collection and other protocols are one-to-many processes, employed during sessions when communication occurs between the interrogator 7 and the pagers 8 in an environment where multiple pagers may attempt to communicate simultaneously with interrogator 7. The following description applies to the batch collection process sequencing to perform a POLL PagerS session in the preferred embodiment.

For a POLL PagerS session, LIST 1 and LIST 2 represent the sequenced operation wherein the communication system polls the pagers to determine if any pagers are awake and requesting communication with interrogator 7. In one example, pagers are awakened in response to an interrupt input 32 from external unit 29 to processor 2 of FIG. 5.

INTERROGATOR STATE 59. Referring to FIG. 4 and LIST 1, the IDLE state 59 represents the idle state of the interrogator 7. From this state, the interrogator 7 commences different operations. Upon receiving a request for a session to perform an operation, the processing in the interrogator passes to TEST SESSION TYPE state 60.

INTERROGATOR STATE 60, 60-1, . . . , 60-S. In state 60, interrogator 7 tests to determine the type of session to be executed. State 60 first tests to determine if a Pager INVENTORY operation is to be performed. Assuming a Pager INVENTORY operation is not to be performed, a NO result of the test sends the processing to the next TEST SESSION TYPE state 60-1.

The TEST SESSION TYPE state 60-1 tests to determine if a POLL PagerS session is to be performed. In this present example, a POLL PagerS operation is to be performed, therefore, a YES result of the test sends the processing to the INITIALIZE VARIABLES state 62.

INTERROGATOR STATE 62. In INITIALIZE VARIABLES state 62, the contents of variable CYCLECOUNT 80 are initialized to 1, the contents of index variable RFMIDX 81 are initialized to 1 and the contents of variable RFMDONE 82 are initialized to 0. The contents of table Pager TABLE 83 are cleared and the contents of variables CREDIT(1) 84, . . . , CREDIT(N) 84+(N−1) are each initialized to a predetermined value C. In the preferred embodiment, the value C equals 3. In the preferred embodiment, the quantity N is equal to 3, the number of RF modules installed in the interrogator. In the same manner as for a Pager INVENTORY session, the interrogator advances to the EXAMINE CREDITS state 63 and then to SEND COMMAND state 64.

Pager STATE 90. Referring now to FIG. 5 and LIST 2, the pagers 8 are quiescent in the low-power sleep mode in SLEEP state 90 as previously described. For POLL PagerS and many other sessions, the constant interrogation of all pagers within radio range of the interrogator 7 or other operation requiring high-power consumption by the pagers is not desired. Low-power operation is important for battery-operated pagers. In this present example, it is assumed that all pagers normally are in low-power, standby mode (sleep mode), as previously discussed, and are awakened and interrogated only as the need arises as a result of an interrupt to processor 2 of FIG. 5. If the wake-up signal is not present, the pager remains in the sleep mode unless an interrupt signal is present. If the interrupt signal is present, the processor 2 awakens the pager from its sleep state and the pager advances to INITALZE TIMER state 91.

Pager STATE 91. In INITIALIZE TIMER state 91, the pager initializes variable WAIT TIMER 89 to the value W, W has a value of 30 seconds in the preferred embodiment. The pager continues to LISTEN FOR COMMAND state 92.

The POLL PagerS process sequencing in the interrogator now sends the INTERRUPT_HELLO command that will cause all pagers in the region that are awake to respond in the same manner as for an INVENTORY process. Only those pagers awakened by an interrupt as previously described will receive the INTERRUPT_HELLO command. From this time on, the sequencing is the same as previously described in connection with the Pager INVENTORY session, except that the interrogator sends the INTERRUPT_HELLO command instead of SET_WINDOW or HELLO as the interrogator is now using the batch collection protocol to identify all pagers that are awake. Since the interrogator did not transmit a wake-up command, the pagers are awake under their on initiation by operation of an interrupt signal, for example. The operation described for polling pagers is an example of a reverse wake-up operation in which the pager awakens in response to a stimulus. While the stimulus can be via the processor interrupt, the stimulus can also be from an alarm or other signal from one of the attached I/O units 18 of FIG. 4 thereby, in the case of an alarm, embodying a polled remote alarm system. The interrupt stimulus may also be from a switch or other device activated by a person carrying the pager, as for example, for personal identification.

Turn on Beeper Session

Referring now to LIST 1, LIST 2 and LIST 3 and FIG. 3, FIG. 4 and FIG. 5, an example of a one-to-many followed by a one-to-one communication sequence is shown. In this example, causing a particular one of the pagers in the region to execute a function is accomplished by first waking up all pagers in the region by executing the wake up sequence, subsequently directing all pagers except the desired pager to resume the sleep state and then commanding the desired pager to execute the function. The batch collection protocol is not employed in this sequence as it is necessary only to wake up the pagers and command the directed pager to perform the desired action.

The sequence begins with the interrogator sending the WAKE-UP signal to all pagers. The interrogator then sends the ALL_SLEEP command of TABLE 1 with the address (pager ID) code of the desired pager as the command argument. The ALL_SLEEP command is a broadcast command directing all pagers except the pager identified by the ID code to immediately resume the sleep state. The interrogator follows the ALL_SLEEP command with the BEEP_ON command, a directed command of TABLE 1, again with the address (pager ID) code of the desired pager as the command argument. The pager, on receipt of the BEEP_ON command, transmits back to the interrogator a response code indicating successful receipt of the command and associated information bytes containing the status of the pager. The pager then activates the beeper for a predefined time, in the preferred embodiment three minutes, after which it automatically resumes the sleep state.

In the following discussion of the flow of this process, the states 160 to 169 are operational blocks describing the processing of the BEEPER ON sequence by an interrogator and a plurality of pagers. These blocks each incorporate one or more of the states 91 to 96 of LIST 2 which are executed internally within the block being discussed and are not shown in LIST 3 for clarity.

BEEP ON STATE 160. Referring now to LIST 1 and LIST 3, the interrogator in the example has arrived at START state 160 having being commanded to execute a BEEPER ON sequence to energize the beeper of a particular one of a plurality of pagers. The address (D code) of the particular pager has been transmitted to the interrogator and has been stored internally in processor 102. The process continues to SEND WAKE UP state 161.

BEEP ON STATE 161. For directed pager communication and for many other types of sessions, the constant operation of all pagers within radio range of the interrogator 7 (or other operation requiring high-power consumption by the pagers) is not desired. Low-power operation is important for battery-operated pagers to extend battery life in the pagers. In the present example, it is assumed that all pagers normally are in a low-power standby mode (sleep mode) and are awakened only as the need arises.

In SEND WAKE-UP state 161, the interrogator transmits a WAKE-UP signal to wake up sleeping pagers in the same manner as described previously for LIST 1 SEND WAKE UP state 61. After having sent the plurality of WAKE-UP signals as described, the process continues to PagerS WAKE UP state 162.

BEEP ON STATE 162. In PagerS WAKE UP state 162, each pager in the region 9, in the sleep mode of SLEEP state 90 of LIST 2, responds to the WAKE_UP signal in the same manner as described previously in LIST 2 and advances to INITIALIZE TIMER state 91 and then to LISTEN FOR COMMAND state 92. The process continues to SEND ALL SLEEP COMMAND state 163.

BEEP ON STATE 163. In SEND ALL SLEEP COMMAND state 163, to conserve battery energy in the plurality of pagers, the interrogator transmits an ALL_SLEEP command of TABLE 1 to the plurality of pagers, using the address (held in storage in processor 102) of the particular pager whose beeper is to be energized as the argument to the command. The process continues to RECEIVE SLEEP COMMAND state 164.

BEEP ON STATE 164. In RECEIVE SLEEP COMMAND state 164, the pager receives the ALL_SLEEP command from the interrogator. Each pager compares the address (ID code) argument of the command with its own address (ID code). If the result of the compare is FALSE, that is, the particular pager is not being addressed, the pager returns to the sleep mode of SLEEP state 90 of LIST 2. No further action occurs with this particular pager.

If the result of the compare is TRUE, that is, the particular pager is being addressed, the process continues to SEND BEEP ON COMMAND state 165 where the pager awaits a further command from the interrogator.

BEEP ON STATE 165. In SEND BEEP ON COMMAND state 165, the interrogator transmits the BEEP ON command of TABLE 1, using as an argument the address (held in storage in processor 102) of the particular pager to be energized. The process flow continues to WAIT FOR STATUS state 166.

BEEP ON STATE 166. In WAIT FOR STATUS state 166 the interrogator is waiting for the command response from the addressed pager for a period of time which in the preferred embodiment is approximately 114 milliseconds. During this time period, the pager is expected to return an acknowledgement of the command. When the status response is received from the pager, or at the end of the time period if the response from the pager is not received within the time period, the interrogator will set an appropriate status code, send the code to computer 40 and then return to IDLE state 59 of LIST 1. The process flow continues to RECEIVE BEEP ON COMMAND state 167.

BEEP ON STATE 167. In RECEIVE BEEP ON COMMAND state 167, the pager has received the BEEP_ON command and compares the address argument of the command with its own address.

If the comparison result is FALSE, this indicates that the particular pager responded incorrectly to the ALL_SLEEP command of state 163, that is it either did not hear the command correctly or it incorrectly compared the address argument. In either event, on failure to verify the address, the pager returns to the INTIALIZE TIMER state 91 and then to LISTEN FOR COMMAND state 92 to await further commands. Since the interrogator has no knowledge of the state of this pager, that is this pager has remained awake erroneously, the pager will remain in the loop states 92 and 92-1 until the WAIT TIMER equals zero, at which time the pager returns to the sleep mode at SLEEP state 90. In this manner the process functions in a fail safe manner.

If the comparison result is TRUE, the pager has been addressed and the process flow continues to SEND STATUS state 168.

BEEP ON STATE 168. In SEND STATUS state 168, the pager transmits its address ID code and a status byte back to the interrogator. The status byte is of the same format as the response to the HELLO or SET_WINDOW command, that is a preamble followed by an address, and additionally accompanied by the status byte. This transmission is collision free as all other pagers are either in the sleep state, having not found a TRUE comparison when the address of the original command was matched as described in state 164 or, as previously discussed having erroneously found true the address code, are in the LISTEN FOR COMMAND state 92.

On receipt of the address ID and status information, the interrogator sends the information to the computer 40 and returns to the idle state as discussed in state 166. After transmission of the status information, the process flow continues to SET BEEPER ON state 169.

BEEP ON STATE 169. In SET BEEPER ON state 169, the pager activates the beeper for a predetermined time, in the preferred embodiment three minutes, and then deactivates the beeper. The BEEPER ON function then terminates with the pager advancing to SLEEP state 90 of LIST 2.

Code Listing

The actual computer code used in one preferred embodiment, comprising code in C program language and in assembly language for the processors identified above, is included in CODE LISTING 1 APPENDIX (corresponding to LIST 1 above) and CODE LISTING 2 APPENDIX (corresponding to LIST 2 above). The code modules are entitled as follows:

CODE LISTING 1—INTERROGATOR CODE MODULES

ADC.05H
C6805C9.H
CLOCK.05H
COLLECT.05H
COLLECT.H
COMCMDS.H
COMMNDS.05H
COMMUNIC.05H
CONFIG.H
DATABASE.05H
DELAYDEF.H
DELAYS.05H
DFPagerNIL..05H
DPOT.05H
EEPROM.05H
FLAGS.H
HW.05H
HW.H
INT.05C
INT.H
IO.05H
LCD.05H
MACROS.05H
NIUNULL.05H
RAM.05H
RS232.05H
SCANRSSI.05H
SCANRSSI.H
SCI.05H
STDDEF.H
TIMER.05H
UTIL.05H
WATCHDOG.05H
XPager.05H CODE LISTING 2—Pager CODE MODULES COMCMDS.H
COMMUNIC.05H
DELAYDEF.H
DELAYS.05H
EEPROM.05H
LCD.05H
MSGS.05H
STDDEF.H
Pager.05C
PagerCONFG.H The sequencing represented by LIST 1, LIST 2, LIST 3 and LIST 4 is functional and represents concisely the operation of the preferred embodiment of the present invention. The actual detailed operation appears in CODE LISTING 1 APPENDIX and CODE LISTING 2 APPENDIX. The correspondence between the actual code listings and LIST 1 through LIST 4 is illustrated through the following examples.

1. The interrogator process flow shown in LIST 1 states 63 through 72 is implemented in CODE LISTING 1, module "COLLECT.05H" lines 286 to 325.

2. The interrogator process flow shown in LIST 1 state 70 is implemented in CODE LISTING 1, module "COLLECT.05H" line 212 and lines 145 to 173.

3. The interrogator process flow shown in LIST 1 states 64, 66 through 70 is implemented in CODE LISTING 1, module "COLLECT.05H" lines 181 to 223.

4. The interrogator process flow shown in LIST 1 states 60, 60-1, 60-2, . . . , 60-S is implemented in CODE LISTING 1, module "INT.05C" lines 352 to 507.

5. The pager process flow shown in LIST 2 states 91, . . . , 93-S is implemented in CODE LISTING 2, module "Pager.05C" lines 502 to 524.

6. The pager process flow shown in LIST 2 states 94, 95 and 96 is implemented in CODE LISTING 2, module "Pager.05C" lines 387 to 394, lines 938 to 971 and lines 543 to 561.

7. The BEEP ON process flow shown in LIST 3 state 160 to 169 is implemented in CODE LISTING 1 module "MACROS.05H" lines 17 to 24 and lines 44 to 48, and in module COMMANDS.05H, lines 197 to 224. It will be apparent by one skilled in the art that the multiple steps of these states are implemented as a macro command series and include functions executed in other modules and that this series executes a beeper on command. Other functions are readily implemented using the macro command set included in or contemplated for the invention.

8. The BEEP ON process flow shown in LIST 3 state 167 is implemented in CODE LISTING 2 module "Pager.05C" lines 457 to 468, lines 384 to 419 and lines 572 to 600. It will be apparent by one skilled in the art that the multiple steps of the state 167 of LIST 3 are implemented by the functions included in this sequence of code series and that this series executes a beeper on command and that other functions are readily implemented.

9. The pager location process in LIST 4 states 301 and 304 is implemented in CODE LISTING 1, module "INT.05C" line 353 and module "COLLECT.05H" lines 243 to 325.

10. The pager location process in LIST 4 states 302 and 305 is implemented in CODE LISTING 1, module "INT.05C" line 358 and in module "COLLECT.05H" lines 437 to 442 and lines 352 to 421.

Further and Other Embodiments

Each of the different operations described in CODE LISTING 1 and CODE LISTING 2 may be implemented requiring only the execution of the different commands listed in TABLE 1 from the computer 40. Similarly, new and unique commands may be included by altering the current code using well known programming techniques. For example, as may be seen from the command list of TABLE 1 and CODE LISTING 1 and CODE LISTING 2, the system of the present invention also operates in the following ways:

A. messaging, where the pager appends a message to its address ID response to a broadcast (one-to-many) command, means existing then to quickly ascertain the status of a plurality of pagers;

B. messaging, where the pager appends a message to its address ID response to a directed (one-to-one) command, means existing then for a pager to communicate data or other information to the interrogator and subsequently to a host system;

C. reverse messaging, where the interrogator adds a message to a specific pager's acknowledgement signal, means existing then to communicate data or other information from the interrogator or a host system via the interrogator to a pager.

In accordance with the present invention, the collision avoidance method employs randomization based on any of several communication parameters. In the preferred embodiment described in detail above, response delay is used as the parameter, however, the method can employ frequency, phase, amplitude or spatial variation parameters. Also, a linear recursive sequence generator seeded by the pager identification number may be used to generate a pseudo-random delay. In this manner, the diversity of time selection of responding pagers expedites communication in the system.

Another mode of enhancement that may be employed in the interrogator apparatus is parameter enhancement. For instance, effective transmission power may be enhanced through the use of repeater apparatus. To implement the repeater, relay units rebroadcast a pager signal from a pager to a more distant interrogator unit that has a particular association with that particular pager. Such a system increases the effective range between pagers and their associated interrogators.

Additional applications of the present invention use time measurement methods to determine the range and direction from an interrogator to a pager. The pager embodies a simple time measurement apparatus, such as a time-of-day clock and incorporates in the pager address response an indication of a time difference measurement. Such time measurements from pagers allows an interrogator to determine the distance to a responding pager. Such enhancements are implemented by employing radio or acoustic transmissions along one path of the two way link between the pager and the interrogator. In addition, multiple beams may be used to provide direction measurement using conventional triangulation techniques.

Additional applications of the present invention relate to the use of external sensing apparatus incorporated in or associated with pagers. A signal from an external sensor is incorporated within the pager address response to the interrogator synchronization command. The pager can also return elapsed time measurements along with the state of thermal, pressure or other outputs from physical sensors. This data affords an interrogator information as to the environment history of the pager or the current state of physical devices, such as the state of a lock or a continuity sensor.

The present invention is also operable wherein a plurality of batch collection periods are executed without the wake-up sequence. Such operation may employ pagers which self-awaken with external stimulus. For instance, a thermal sensor may detect an out of range temperature of the pager environment. In such an example, only those pagers having experienced an out of range circumstance would respond to a batch collection, all others would remain silent in the absence of a wake-up signal.

Wake-up and non-wake-up batch collection sequences may be combined. In such a system the interrogator rarely executes a batch collection process preceded with the wake-up command. Alternatively, the batch collection processes are performed without the wake-up period. Such a system extends pager battery life while still maintaining surveillance of the pagers in the communication region. Only those pagers with unusual circumstances to report would respond to a batch collection in the absence of a wake-up command. By way of contrast, all pagers respond to a sequence preceded by a wake-up command.

Other embodiments modify the wake-up signal using time, frequency or pulse coding methods to address only a subset of the pagers in the communication region of the interrogator. Envisioned also are embodiments using infrared or acoustic energy for the wake-up signal.

Additional embodiments envisioned are directed wake-up using a special wake-up frequency followed by a pager address code which wakes-up only the specifically addressed pager.

While the invention has been particularly shown and described with reference to preferred embodiments thereof it will be understood by those skilled in the art that various changes in form and details may be made therein without departing from the spirit and scope of the invention.

We claim:

1. A communication system for communicating in a communication region comprising, an interrogator including:

an interrogator memory for storing interrogator sequencing code including a broadcast command and a directed command, an interrogator processor connected for accessing said interrogator memory and for processing said interrogator sequencing code to sequence said broadcast command and said directed command, an interrogator transceiver connected to said interrogator processor for sending and receiving communications in said communication region over a common communication channel including sending said broadcast command and said directed command, a plurality of pagers dispersed within the communication region, each of said pagers including:

a pager transceiver for sending and receiving communications including a page signal to and from said interrogator transceiver over said common communication channel, a pager memory for storing information including pager sequencing code and a set of predefined reply messages operable to be selected for transmission by a user of said pager, a paper processor, connected to said paper transceiver to receive said broadcast command and said directed command, for processing said pager sequencing code to send a response to said interrogator through said pager transceiver and for transmitting one of said set of predefined reply messages as a reply signal, whereby two or more of said plurality of pagers dispersed within the communication region may each send a response over said common communication channel during the same time period such that at some times a collision of responses occurs and such that at other times no collision of responses occurs, wherein said broadcast command requests pager ID's from all pagers, for each pager, said pager processor sends a pager ID with said response upon receipt of said broadcast command, and for each pager for which said interrogator receives a pager ID, said interrogator processor sends said directed command to acknowledge that said pager ID has been received, wherein each of said pagers has a unique pager ID and said interrogator collects the pager ID's from pagers in the communication region using communications between said interrogators and said pagers during a plurality of collection periods, said interrogator having in said interrogator code, synchronizing code for sending synchronizing signals to said pagers to initiate each of said collection periods, bandwidth code for controlling the bandwidth of said collection periods, each said pager having means for inhibiting sending a pager ID after receipt of one of said directed commands.

2. The communication system of claim 1 wherein said interrogator establishes said collection periods as collection periods CP(1), CP(2), . . . , CP(p), . . . , CP(P) having respectively listen periods LP(1), LP(2), . . . , LP(p), . . . , LP(P) and having respectively acknowledge periods AP(1), AP(2), . . . , AP(p), . . . , AP(P).

3. The communication system of claim 2 wherein said bandwidth code sets the bandwidth of each collection period by setting the duration of the respective listen period.

4. The communication system of claim 3 wherein for one or more subsequent listen periods after the first listen period LP(1), the listen periods are shorter in duration than the listen period LP(1).

5. The communication system of claim 4 wherein said first listen period LP(1) and said one or more subsequent listen periods each have durations that permit receipt of separate transmissions of pager IDs from a plurality of pagers.

6. The communication system of claim 5 wherein for a plurality of said one or more listen periods, each successive listen period is approximately one-half the duration of the preceding listen period.

7. The communication system of claim 5 wherein for said listen periods, each of said pagers has response means for distributing the pager ID to a particular response time during the respective listen period.

8. The communication system of claim 7 wherein said particular response time is determined for each said pager by a hash table algorithm using the pager ID for said pager.

9. The communication system of claim 7 wherein said particular response time is randomly determined for each said pager using a randomizing element to generate said particular response time.

10. The communication system of claim 1 wherein said pagers have sleep and awake modes and said interrogator collects messages from said pagers in the communication region using communications between said interrogators and said pagers during a collection period, said interrogator having in said interrogator sequencing code, wake-up code for sending a wake-up signal to said pagers, synchronizing code for sending a synchronizing signal to said pagers to initiate a collection period, each said pager having a controllable power gate for providing power to said pager transceiver in a low-power state and in a normal-power state where said pager processor controls said power gate to select said normal-power state in response to said wake-up signal, and each said pager having in said pager sequencing code, code for controlling the sleep mode in the low-power state in response to said directed command from said interrogator, code for sensing said synchronizing signal if said pager is in said awake mode, code for sending said response to said interrogator in response to a synchronizing signal from said interrogator if said pager is in the awake mode.

11. The communication system of claim 1 wherein each of said pagers includes a controllable power means for providing power to said pager transceiver in a low-power state for a sleep mode and in a normal-power state for an awake mode where said pager processor controls said power means to select said low-power state or said normal-power state.

12. The communication system of claim 11 wherein, said broadcast command requests all pagers but one specific pager to go to said sleep mode, for each pager except said one specific pager, said pager processor upon receipt of said broadcast command causes said pager to go to said sleep mode, for said specific pager, said interrogator processor sends said directed command to command an action by said specific pager, said pager processor for said specific pager upon receipt of said directed command sends said response including the pager ID to said interrogator.

13. The communication system of claim 11 wherein said interrogator includes wake-up means for sending a wake-up signal to said pagers and wherein said pager processor is responsive to said wake-up signal from said interrogator for switching to said normal-power state.

14. The communication system of claim 11 wherein said pager transceiver in each of said pagers includes,
a radio frequency transmitter,
a radio frequency receiver,
an antenna connected to said transmitter and receiver.

15. A communication system for communicating in a communication region comprising,
an interrogator including:
an interrogator memory for storing interrogator sequencing code including a broadcast command and a directed command,
an interrogator processor connected for accessing said interrogator memory and for processing said interrogator sequencing code to sequence said broadcast command and said directed command,
an interrogator transceiver connected to said interrogator processor for sending and receiving communications in said communication region over a common communication channel including sending said broadcast command and said directed command,
a plurality of pagers dispersed within the communication region, each of said papers including:
a pager transceiver for sending and receiving communications including a page signal to and from said interrogator transceiver over said common communication channel,
a pager memory for storing information including pager sequencing code and a set of predefined reply messages operable to be selected for transmission by a user of said pager,
a pager processor, connected to said pager transceiver to receive said broadcast command and said directed command, for processing said pager sequencing code to send a response to said interrogator through said pager transceiver and for transmitting one of said set of predefined reply messages as a reply signal,
whereby two or more of said plurality of pagers dispersed within the communication region may each send a response over said common communication channel during the same time period such that at some times a collision of responses occurs and such that at other times no collision of responses occurs,
wherein said broadcast command requests pager ID's from all pagers,
for each pager, said pager processor sends a pager ID with said response upon receipt of said broadcast command, and
for each pager for which said interrogator receives a pager ID, said interrogator processor sends said directed command to acknowledge that said pager ID has been received,
wherein each of said pagers has a unique pager ID and said interrogator collects the pager ID's from pagers in the communication region using communications between said interrogators and said pagers during a plurality of collection periods, said interrogator having in said interrogator code,
synchronizing code for sending synchronizing signals to said pagers to initiate each of said collection periods,
bandwidth code for controlling the bandwidth of said collection periods, each said pager having means for inhibiting sending a pager ID after receipt of one of said acknowledge signals and for sending a pager ID only once for each collection period.

16. A communication system for communicating in a communication region comprising,
an interrogator including:
an interrogator memory for storing interrogator sequencing code including a broadcast command and a directed command,
an interrogator processor connected for accessing said interrogator memory and for processing said interrogator sequencing code to sequence wherein said broadcast command and said directed command,
an interrogator transceiver connected to said interrogator processor for sending and receiving communications in said communication region over a common communication channel including sending said broadcast command and said directed command,
a plurality of pagers dispersed within the communication region, each of said pagers including:
a pager transceiver for sending and receiving communications including a page signal to and from said interrogator transceiver over said common communication channel,
a pager memory for storing information including pager sequencing code and a set of predefined reply messages operable to be selected for transmission by a user of said pager,
a pager processor, connected to said pater transceiver to receive said broadcast command and said directed command, for processing said pager sequencing code to send a response to said interrogator through said pager transceiver and for transmitting one of said set of predefined reply messages as a reply signal,
whereby two or more of said plurality of pagers dispersed within the communication region may each send a response over said common communication channel during the same time period such that at some times a collision of responses occurs and such that at other times no collision of responses occurs,
wherein said interrogator transceiver includes,
a plurality of polarization diverse and spatially diverse transceivers, each transceiver including,
an antenna,
a radio frequency transmitter connected to said interrogator processor to provide output signals to said antenna for transmission to said pagers,
a radio frequency receiver connected to said antenna to receive signals from said pagers to provide input signals to said interrogator processor,
signal strength detection means for detecting the signal strength of the signals received at each of said receivers from said pagers and for providing a signal strength indication to said interrogator processor from each of said receivers,
said interrogator processor connected to a switch to select for each of said pagers the transceiver having the receiver providing the highest signal strength.

17. A communication system for communicating in a communication region comprising,
an interrogator including:
an interrogator memory for storing interrogator sequencing code including a broadcast command and a directed command,
an interrogator processor connected for accessing said interrogator memory and for processing said interrogator sequencing code to sequence said broadcast command and said directed command, an interrogator transceiver connected to said interrogator processor for sending and receiving communications in said communication region over a common communication channel including sending said broadcast command and said directed command, a plurality of pagers dispersed within the communication region, each of said pagers including:

a pager transceiver for sending and receiving communications including a page signal to and from said interrogator transceiver over said common communication channel, a pager memory for storing information including pager sequencing code and a set of predefined reply messages operable to be selected for transmission by a user of said pager, a pager processor, connected to said pager transceiver to receive said broadcast command and said directed command, for processing said pager sequencing code to send a response to said interrogator through said pager transceiver and for transmitting one of said set of predefined reply messages as a reply signal, whereby two or more of said plurality of pagers dispersed within the communication region may each send a response over said common communication channel during the same time period such that at some times a collision of responses occurs and such that at other times no collision of responses occurs, wherein said pagers have sleep and awake modes and said interrogator collects messages from said pagers in the communication region using communications between said interrogators and said pagers during a collection period, said interrogator having in said interrogator code, synchronizing code for sending a synchronizing signal to said pagers to initiate said collection period, each said pager having in said pager sequencing code, mode code for controlling the sleep mode and awake mode of the pager processor, sensing code for sensing said synchronizing, signal if said pager is in said awake mode, send code for sending said response to said interrogator in response to said synchronizing signal from said interrogator if said pager is in the awake mode, wherein said pager processor includes an interrupt input for interrupting pager processor operation, and wherein said system includes a unit connected to said pager processor interrupt input for providing an interrupt signal for signaling the presence of said broadcast command from said unit, and wherein said mode code is responsive to said interrupt signal to cause said pager to be in the awake mode.

18. The communication system of claim 17 wherein said pager processor sends said response to said interrogator and wherein said interrogator processor after receipt of said response sends an acknowledge signal to said pager.

19. The communication system of claim 18, wherein said acknowledge signal causes said pager to be in the sleep mode.

20. The communication system of claim 18, wherein said acknowledge signal is a directed command.

21. The communication system of claim 17 wherein said pager processor includes a reset input and a unit connected to said reset input for providing a reset signal for signaling the presence of a wake-up signal from said interrogator, and wherein said mode code is responsive to said wake-up signal to cause said pager to be in the awake mode.

* * * * *

UNITED STATES PATENT AND TRADEMARK OFFICE
CERTIFICATE OF CORRECTION

PATENT NO. : 5,973,613
DATED : October 26, 1999
INVENTOR(S) : Robert Steven Reis et al.

It is certified that error appears in the above-identified patent and that said Letters Patent is hereby corrected as shown below:

Title page,
Item [57], ABSTRACT, after "device" please delete "received" and insert
-- receives --.

Column 2,
Line 60, after "interrogator", delete "win", and insert -- will --.

Column 10,
Line 27, after "has", delete "authorition", and insert -- authorization --.

Column 11,
Line 64, after "line", delete "129", and insert -- 126 --.

Column 14,
Line 49, delete "(NOVRAW", and insert -- (NOVRAM --.

Column 17,
Line 58, after "11011010 GET_ERROR 3 byte ID Get error vector from addresses pager. Returns: Pager ID + error byte", please insert -- 11011101 CLR_ERROR 3 byte ID Clears the error vector on addressed pager. Return: Pager ID. --.

Column 19,
Line 35, after "period", delete "IP(p)", and insert -- LP(p) --.
Line 53, after "pagers", delete "T(P,1), T(P,2),...,ssP), T(P,SSP), and insert -- T(P1), T(P,2), ..., T(P,ssP), ...,T(P,SSP). --.

Column 29,
Line 165, after "INTERROGATOR SENDS", delete "BEEP ON" and insert -- BEEP_ON --.
Line 166, (Omitted), please insert

| WAIT FOR STATUS |
| INTERROGATOR WAITS FOR Pager TO |
| SEND STATUS |

↓
↓

Column 31,
Line 27, after "the", delete "INITALZE" and insert -- INITIALIZE --.

UNITED STATES PATENT AND TRADEMARK OFFICE
CERTIFICATE OF CORRECTION

PATENT NO.   : 5,973,613
DATED        : October 26, 1999
INVENTOR(S)  : Robert Steven Reis et al.

It is certified that error appears in the above-identified patent and that said Letters Patent is hereby corrected as shown below:

Column 32,
Line 22, after "in", delete "INIALIZE", and insert -- INITIALIZE --.

Column 35,
Line 49, after "84+" delete "(RFMWX-1), and insert -- (RFMIDX-1) --.

Column 36,
Line 5, after "variable", delete "RFMWX" and insert -- RFMIDX --.

Column 38,
Line 16, after "address", delete "(D code)", and insert -- (ID code) --.

Column 40,
Line 5, delete "COMMNDS.05H", and insert -- COMMANDS.05H --.

Column 44,
Line 8, after "claim", delete "5" and insert -- 3 --.

Column 46,
Line 26, after "said", delete "pater", and insert -- pager --.

Signed and Sealed this

Eighteenth Day of December, 2001

Attest:

Attesting Officer

JAMES E. ROGAN
Director of the United States Patent and Trademark Office